(12) United States Patent
Corona et al.

(10) Patent No.: US 9,420,641 B2
(45) Date of Patent: Aug. 16, 2016

(54) MICROWAVE OVEN MULTIVIEW SILHOUETTE VOLUME CALCULATION FOR MASS ESTIMATION

(71) Applicant: Whirlpool Corporation, Benton Harbor, MI (US)

(72) Inventors: Enrique Corona, St. Joseph, MI (US); Fredrik Hallgren, Kolmarden (SE); Horacio Polli, St. Joseph, MI (US); Gianpiero Santacatterina, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 171 days.

(21) Appl. No.: 14/230,371

(22) Filed: Mar. 31, 2014

(65) Prior Publication Data

US 2014/0203012 A1 Jul. 24, 2014

Related U.S. Application Data

(63) Continuation-in-part of application No. 13/747,847, filed on Jan. 23, 2013.

(51) Int. Cl.
*H05B 6/68* (2006.01)
*H05B 6/64* (2006.01)
(Continued)

(52) U.S. Cl.
CPC ............ *H05B 6/6447* (2013.01); *A23L 1/0128* (2013.01); *H05B 6/686* (2013.01); *H05B 6/688* (2013.01); *H05B 6/705* (2013.01); *Y02B 40/143* (2013.01)

(58) Field of Classification Search
CPC .............. H05B 6/64; H05B 6/66; H05B 6/68; H05B 6/70; H05B 6/6447; H05B 6/6455; H05B 6/705; H05B 6/686; H05B 6/688
USPC .......................... 219/702, 709, 710, 716, 761
See application file for complete search history.

(56) References Cited

U.S. PATENT DOCUMENTS

| | | |
|---|---|---|
| 4,831,239 A | 5/1989 | Ueda |
| 4,868,357 A | 9/1989 | Serikawa et al. |

(Continued)

FOREIGN PATENT DOCUMENTS

| | | |
|---|---|---|
| EP | 1076475 A2 | 2/2001 |
| EP | 2051564 A1 | 8/2007 |

(Continued)

OTHER PUBLICATIONS

European Patent Application No. 12152039.3 filed Jan. 23, 2012, European Publication No. 12152039, published Oct. 18, 2012.

*Primary Examiner* — Brian Jennison

(57) ABSTRACT

A microwave heating apparatus includes a cavity arranged to receive a load. At least one microwave generator is configured to feed a plurality of microwaves into the cavity. At least one image-capturing device and a control unit is adapted to obtain load volume information of the load within the cavity based on information recorded by the image-capturing device about at least one portion of the load, obtain load density information using at least one of a user input and information recorded by the image-capturing device about at least one portion of the load, determine load mass information based upon the load volume information and the load density information, determine a heating pattern based upon the load mass information and control the at least one microwave generator to provide the heating pattern within the cavity.

20 Claims, 13 Drawing Sheets

(51) Int. Cl.
*A23L 1/01* (2006.01)
*H05B 6/70* (2006.01)

(56) References Cited

U.S. PATENT DOCUMENTS

| | | | |
|---|---|---|---|
| 5,293,019 | A | 3/1994 | Lee |
| 5,360,965 | A | 11/1994 | Ishii et al. |
| 5,361,681 | A | 11/1994 | Hedstrom et al. |
| 5,369,253 | A | 11/1994 | Kuwata et al. |
| 5,512,736 | A | 4/1996 | Kang et al. |
| 6,172,348 | B1 | 1/2001 | Yoshino et al. |
| 6,559,882 | B1 | 5/2003 | Kerchner |
| 7,326,888 | B2 | 2/2008 | Chun et al. |
| 7,501,608 | B2 | 3/2009 | Hallgren |
| 2010/0182136 | A1 | 7/2010 | Pryor |
| 2010/0187224 | A1* | 7/2010 | Hyde ............... H05B 6/705 219/720 |
| 2010/0231506 | A1 | 9/2010 | Pryor |
| 2012/0168645 | A1 | 7/2012 | Atzmony |
| 2013/0056460 | A1 | 3/2013 | Ben-Shmuel et al. |
| 2013/0142923 | A1 | 6/2013 | Torres et al. |
| 2013/0146590 | A1 | 6/2013 | Einziger et al. |
| 2013/0186887 | A1 | 7/2013 | Hallgren et al. |

FOREIGN PATENT DOCUMENTS

| | | |
|---|---|---|
| EP | 2205043 A1 | 7/2010 |
| WO | 0223953 A1 | 3/2002 |
| WO | 2011058538 A1 | 5/2011 |

\* cited by examiner

MICROWAVE OVEN MULTIVIEW SILHOUETTE VOLUME CALCULATION FOR MASS ESTIMATION

CROSS-REFERENCE TO RELATED APPLICATION(S)

This application is a continuation-in-part of U.S. patent application Ser. No. 13/747,847, filed on Jan. 23, 2013, entitled "MICROWAVE HEATING APPARATUS," the disclosure of which is hereby incorporated herein by reference in its entirety.

TECHNICAL FIELD

The present disclosure relates to the field of microwave heating, and in particular to a microwave heating apparatus for heating a load by means of microwaves.

BACKGROUND

Microwave ovens usually comprise a cooking chamber in which food is placed to be heated, a magnetron for generating microwaves and a feeding port for feeding the microwaves into the cavity. A common problem associated with microwave ovens is that the heating provided by the microwaves is unevenly distributed within the cavity. This causes some parts of the food to be heated more rapidly than other parts. In other words, the heating results in food having regions of different temperatures (i.e. being more or less hot). For example, food that has been defrosted in a microwave oven often contains parts which are still frozen, while other parts of the food may be really hot. To ensure that all parts of the food in the microwave oven are properly heated, the user often heats the food for an extra long time, thereby running the risk of burning parts of the food because of overheating.

Several different approaches have been employed to overcome such a problem. A more even heating in a microwave oven may for example be obtained by placing the food on a turntable in the cavity. During heating, the turntable is rotated, whereby the heating provided by the microwaves is more evenly distributed in the food. However, the use of rotating turntables still does not provide sufficient spread of the heating in the food. Another drawback is that the introduction of extra moving parts such as the turntable, and a motor for driving the turntable, increases the risk of malfunction and also makes the microwave oven more complicated to manufacture.

Another approach for providing a more even heating is described in EP0788296 where a high frequency heating apparatus with local heating means capable of heating an optional portion of the food is disclosed. The local heating means provides a heating position that is changeable in a radial direction so that an optional portion of the food can be heated in association with rotation of a turntable on which the food is located. A uniform heating distribution of the food may then be obtained by a combined heating of optional portions. Although this high frequency heating apparatus may provide better control of the heating than those only using turntables, it is fairly complicated and still requires a turntable and a motor for rotating the turntable.

Thus, there is a need for new apparatus and methods that would overcome, or at least alleviate, some of the above mentioned drawbacks.

SUMMARY

An object of at least some of the embodiments of the present disclosure is to provide a microwave heating apparatus, and a corresponding method of heating a load using microwaves, with improved control of the heating.

This and further objects of the present disclosure are achieved by means of a microwave heating apparatus and a method having the features defined in the independent and dependent claims.

A microwave heating apparatus is provided. The microwave heating apparatus comprises a cavity arranged to receive a load, a plurality of feeding ports and a control unit. The feeding ports are arranged to feed microwaves from a plurality of microwave generators to the cavity. The control unit is configured to obtain a desired temperature pattern within the cavity based on information about a plurality of regions of the load, determine a heating pattern comprising zones of different intensities corresponding to the desired temperature pattern and control at least some of the plurality of microwave generators for providing the determined heating pattern within the cavity.

A method of heating a load in a cavity using microwaves is provided. The method comprises the steps of obtaining a desired temperature pattern for a plurality of regions of the load, determining a heating pattern with zones of different intensities corresponding to the desired temperature pattern and heating the load with the determined heating pattern in the cavity.

The present disclosure makes use of an understanding that a heating pattern may be obtained via control of at least some of a plurality of microwave generators and that an uneven heating pattern (i.e. a heating pattern corresponding to zones of different microwave intensities) may be used for heating a plurality of regions of a load according to a desired temperature pattern. In the microwave heating apparatus of the present disclosure, information about a plurality of regions of a load is used to determine how much different parts of the load are to be heated. A heating pattern generated by (at least some of) a plurality of microwave generators is then formed, the resulting heating pattern corresponding to the desired heating of the different regions in terms of temperature.

The present disclosure is advantageous in that it provides a microwave heating apparatus capable of heating a load depending on a desired temperature pattern in the load, i.e. depending on the desired temperatures in various parts of the load. Based on the desired temperature pattern, different zones of the cavity are provided with different levels of microwave intensities. With the present disclosure, different desired temperatures may be obtained in various regions of the load, which is particularly advantageous if these various regions are of different types. In other words, the microwave heating apparatus of the present disclosure provides a zone cooking capability, i.e. that different cooking/heating is provided in different zones of the cavity.

The microwave heating apparatus of the present disclosure is a microwave oven, but may also be a larger microwave heating apparatus for industrial appliances or a larger microwave heating apparatus for use in automatic vending machines.

The load may be a single food item or several food items of different types, e.g. meat, potatoes and sauce. The load may consist of more or less homogeneous items such as a piece of butter, but it may also be a piece of lasagna having several different layers. The load may be concentrated to a small part of the cavity or spread out. The load may be large or small compared to the size of the cavity. Further, it will be appreciated that the load may conveniently be disposed in a recipient such as a dish, a bowl or a cup.

The regions of the load may correspond to regions within a single food item or correspond to different pieces of food items. The regions of the load may be of different sizes. The regions of the load may have any possible shape.

As mentioned above, the microwave heating apparatus of the present disclosure can heat loads including different items which may be heated differently to reach different desired finishing states or temperatures. With the present disclosure, instead of heating one item at a time, multiple items of different types can be heated simultaneously and differently, thereby saving both time and energy. Moreover, since the items are heated simultaneously, none of the items will be heated first and run the risk of cooling while the other items are heated. Simultaneous heating also increases efficiency since it reduces the need to stop heating while switching load.

The microwave heating apparatus of the present disclosure may not include a turntable, rotating part, or any associated motor for providing rotation, thereby making the microwave heating apparatus of the present disclosure less complex and facilitating its manufacture. Moreover, the lack of rotating parts renders the microwave heating apparatus faster to control and more adjustable to changing conditions in the cavity.

It will be appreciated that one feeding port may be associated with one or several microwave generators. The feeding ports may be uniformly distributed at walls of the cavity but may also be distributed in any other suitable way depending on the mode fields which are intended to be supported in the cavity.

The cavity may be rectangular, with e.g. several rectangular parts, but may also be cylindrical or have any other shape suitable for heating using microwaves.

The desired temperature pattern may represent different desired finishing temperatures for the regions of the load. Since the heating pattern is determined to comprise zones of different microwave intensities corresponding to the desired temperature pattern, the regions of the load will then be heated to the desired finishing temperatures. The desired temperature pattern may be obtained (at least partly) based on information about regions of the load. Such information may be obtained or derived via recognizing means, which will be described in more detail in the following. The desired temperature pattern may also represent cooking levels or desired finishing states directly entered by a user for the different regions of the load. The information may be entered or acquired before the heating program/procedure is started and the microwave heating apparatus will then be controlled based on such information. The information may also be entered or acquired during heating of the load to dynamically adjust the heating. A change of the user's instructions during the heating may also be envisaged.

A burning sensor may also be used to avoid overcooking such that the heating process can be stopped when burning is detected. A cut-off tube may be placed between any sensors and the cavity in order to prevent microwave leakage and possible contamination of the sensors.

The plurality of microwave generators may include solid state microwave generators or frequency-controllable microwave generators since such microwave generators enable an improved control of the heating pattern in the cavity. The advantages of a solid-state microwave generator comprise the possibility of controlling the frequency of the generated microwaves, controlling the output power of the generator and an inherent narrow-band spectrum.

The control unit may then be configured to control the frequency, the phase and/or the amplitude of the microwaves of at least some of the microwave generators for providing the determined heating pattern. Such control is advantageous since it provides the determined heating pattern without using moving parts and other extra equipment.

The control unit may be configured to select some of the feeding ports and microwave generators based on the determined heating pattern. Depending on the configuration and arrangement of the feeding ports, the control unit may be configured to select and activate the feeding ports providing the mode fields which, in combination, results in the determined heating pattern. For example, a zone of high intensity may be obtained in the cavity by combining two or more mode fields resulting in heating patterns for which the microwave intensities are added at this particular zone of desired high intensity. Analogously, a zone of low intensity may be obtained by combining two or more mode fields resulting in heating patterns which cancel each other at this particular zone of desired low intensity. Thus, only some of the microwave generators and feeding ports may be needed to provide the determined heating pattern.

The terms "high" and "low" above are used in a comparative manner and are not intended to correspond to a specific absolute value for the purpose of the example, although this may be envisaged. In any case, a zone of higher intensity, in comparison to other zones, in the determined heating pattern corresponds to a region of higher temperature, in comparison to the other regions, in the desired temperature pattern. A region with a higher desired temperature is therefore heated with a higher intensity, thereby improving the efficiency of the heating.

The control unit may be configured to use information about size and/or weight of the load to determine the time needed for the microwave heating apparatus to heat various regions of the load. Optionally, the time needed may be shown on a display as information for the user.

According to an embodiment, the control unit may be configured to obtain the desired temperature pattern based on information about locations of the regions of the load within the cavity and food types corresponding to the regions of the load. Information about the type of food in a region of the load is useful in determining a suitable finishing temperature for the region. If the load consists, e.g., of a piece of pie and some ice cream, it is suitable to heat the pie while keeping the ice cream cool. Information about the type of food in a region of the load is to be correlated to a location of the region in the cavity in order to obtain a desired temperature pattern and thereafter determine the heating pattern.

According to an embodiment, the microwave heating apparatus may further comprise recognizing means for recognizing at least one of locations of the regions of the load within the cavity, food types corresponding to the regions of the load, weights of the regions of the load, volumes of the regions of the load and instantaneous temperatures of the regions of the load. The present embodiment is advantageous in that it provides for automatic identification of the content of the cavity and, in particular, the load. In other words, with the recognizing means, the user does not need to input any detailed information about the load. The microwave heating apparatus can automatically obtain a desired temperature pattern based on the information provided by the recognizing means (typically a set of sensors) and thereby determine a corresponding heating pattern. Information about the type of food in a region of the load is useful in determining a suitable finishing temperature for the region. Information about the weights and/or volumes of the regions of the load is useful in determining how much microwave energy is needed to heat a particular region, and therefore in determining the time required for heating such a region. Information about the instantaneous temperatures of the regions of the load is useful for dynamic control of the heating and in particular for determining if further heating of any of the regions is necessary, and in that case how much heating is needed. By "instantaneous temperatures" is meant the current or present temperatures. It should be noted that although a short time period is always needed to measure a temperature, the duration of this time period is negligible compared to the heating process, whereby the measured temperature may be referred to as being instantaneous.

Using recognizing means, a true one touch function may be provided since the microwave heating apparatus is configured to automatically recognize the content of the cavity and in particular the load. In such microwave heating apparatus, the user may only need to select a limited number of options such as the cooking program (e.g. "defrost", "cook" and "reheat"). The microwave heating apparatus may then be able to perform a suitable heating of the load.

If the control unit has access to typical behaviors during heating of different food types (e.g. from a list stored in a memory), the recognizing means may be used to compare the evolution of the load during heating with expected behaviors. This may then be used as feedback for the control unit to adjust the heating accordingly.

According to an embodiment, the microwave heating apparatus may further comprise an image-capturing device arranged to acquire an image of the load arranged in the cavity. The control unit may then be configured to obtain the desired temperature pattern (at least partly) based on the image. The present embodiment is advantageous in that it provides for an automatic detection of the content of the cavity and identification of the load, without user input. The present embodiment is also advantageous in that an image comprises much more information than what could reasonably be requested to be input by a user. The abundance of information obtained from the image may be used to obtain a more suitable desired temperature pattern, thereby further improving heating performance. It will be appreciated that the image may also be used to identify the state of the load and thereby anticipate the cooking program (e.g. frozen food may be recognized and a defrosting program thereby automatically selected).

It should be noted that a plurality of image-capturing devices, of the same or different types, may be used to acquire a plurality of images, from which images the temperature pattern may be derived. Using a plurality of image-capturing devices is advantageous in that the load may be monitored from different angles, providing a more accurate and detailed information about the regions of the load. In particular, a plurality of cameras may be used to obtain 3D-positions of the regions of the load within the cavity.

Optionally, the image-capturing device may be used for empty cavity detection, reducing the risk of damaging the microwave heating apparatus by heating an empty cavity. If a color camera is used as an image-capturing device, the browning of the load may be monitored, and a desired browning level may be achieved by adjusting the heating accordingly.

The image-capturing device may include a charge-coupled device (CCD) or any other equivalent technology such as a CMOS sensor. The sensitivity of the CCD may extend into the infrared range in order for the obtained images to contain information about the temperature of the regions of the load. Determining instantaneous temperatures of the regions of the load is useful for determining if further heating of the regions is necessary, and in that case how much heating is needed depending on the regions. Infrared images may also be used to identify the state of the load and thereby anticipate the cooking program. For example, frozen food may be recognized by being significantly colder than its surrounding and a defrosting program may be selected.

According to an embodiment, the microwave heating apparatus may further comprise an infrared sensor for capturing a temperature image of the regions of the load and/or for identifying the location and/or shape of the regions of the load within the cavity. A temperature image of the regions of the load is useful for determining how much further heating is necessary for the regions. Information about the location and/or shape of the regions of the load within the cavity may be used to obtain a desired temperature pattern suitable for the load. For the purpose of determining the shape and position of regions of the load from an infrared image, the control unit may include a processor or processing means capable of running a special algorithm during the initial heat-up phase of the heating program. Depending on the heat transfer occurring between a region of the load and its surrounding environment during the initial heat-up phase, the control unit may then determine the shape and position of a region of the load (e.g. shape of French fries, a piece of meat or a slice of pizza). In this way, the control unit may also determine the corresponding food type at this position and thereby obtain a desired finishing temperature, the compilation of the desired finishing temperatures for different regions of the load resulting in a desired temperature pattern. Moreover, infrared images may be used to identify the state of the load and thereby anticipate the cooking program. For example, frozen food may be recognized by being significantly colder than its surrounding and a defrosting program may be selected.

According to an embodiment, the microwave heating apparatus may further comprise entry means for entry of information comprising at least one of locations of the regions of the load within the cavity, types of food corresponding to the regions of the load, weights of the regions of the load, volumes of the regions of the load, instantaneous temperatures of the regions of the load, desired finishing temperatures for the regions of the load, and a selected cooking program. The present embodiment provides an alternative to the above embodiments in which such information is obtained automatically via a single sensor or a number of sensors. The present embodiment is also advantageous in that any input of information from a user may complete the information automatically obtained by such sensors. The selected cooking program is an example of what might be difficult to obtain by sensors or images without consulting the user. A selected cooking program may include "defrost", "cook" or "reheat". Any automatically selected or derived cooking program may, e.g., be confirmed by a user via a user interface (buttons or touch screen). Furthermore, the user might want to input instructions which would be difficult for the microwave heating apparatus to anticipate (e.g. heating water to a certain temperature or heating food intended for children to a lower temperature).

According to an embodiment, the control unit may be configured to control some of the microwave generators for simultaneous feeding of microwaves to the cavity. The present embodiment is advantageous in that the addition of heating patterns provided by microwaves originating from different microwave generators (and feeding ports) may result in a heating pattern that would be more difficult or even impossible to obtain with microwaves originating from a single microwave generator (and feeding port) at a time, without using moving parts or advanced feeding systems.

According to an embodiment, the plurality of microwave generators may include magnetrons, and the control unit may be configured to control some of the magnetrons for feeding of microwaves to the cavity during different time periods.

Using different time periods, the microwaves from the different magnetrons will not interfere with each other and can perform independently. The time periods during which the microwaves from different magnetrons are fed to the cavity are short compared to the heating process, thereby ensuring that the heating process evolves as if a single heating pattern was applied to the load.

According to an embodiment, the microwave heating apparatus may further comprise a display screen for displaying the load located in the cavity and entry means for selection of a cooking level for the regions of the load, the temperature pattern corresponding to the selected cooking level. In the present embodiment, the user may directly see where the load, or a region of the load, is located in the cavity and may choose how such a region of the load is to be heated. An advantage of using a display screen is that there is no need for a window at a wall of the cavity for observation of the load. Not using such windows is advantageous since they usually require a shield for minimizing microwave leakage and may also affect the heating patterns in the cavity.

According to an embodiment, the obtaining (of a desired heating pattern) is performed before the start of a heating procedure. This means that a desired temperature pattern is obtained before the load is subjected to heating by the microwave heating apparatus, which is advantageous because the determined heating pattern may then be used already from the start, improving the efficiency of the heating.

According to an embodiment, the obtaining (of a desired heating pattern) is performed during a heating procedure. This means that a desired temperature pattern is obtained during heating of the load. The present embodiment is advantageous in that the determined heating pattern may be altered during the heating procedure, compensating for events and facts that evolve during the heating procedure (such as a change of state of a region of the load) or that were unknown before the start of the heating procedure. For example, the status of the load may be monitored during heating and new desired heating patterns may be obtained each time certain predetermined conditions are met (e.g. that a certain time has elapsed or that a region of the load has reached a certain temperature).

It will be appreciated that any of the features in the embodiments described above for the microwave heating apparatus according to the first aspect of the present disclosure may be combined with the embodiments of the method according to the second aspect of the present disclosure. Similarly, it will be appreciated that any of the features in the embodiments described above for the method according to the second aspect of the present disclosure may be combined with the embodiments of the microwave heating apparatus according to the first aspect of the present disclosure.

Further objectives of, features of, and advantages with, the present disclosure will become apparent when studying the following detailed disclosure, the drawings and the appended claims. Those skilled in the art will realize that different features of the present disclosure can be combined to create embodiments other than those described in the following.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings, in which.

All the figures are schematic, not necessarily to scale, and generally only show parts which are necessary in order to elucidate the disclosure, wherein other parts may be omitted or merely suggested.

DETAILED DESCRIPTION OF EMBODIMENTS

With reference to FIGS. 1 and 3a-c, a microwave heating apparatus according to an embodiment of the present disclosure is described.

Figure 1:
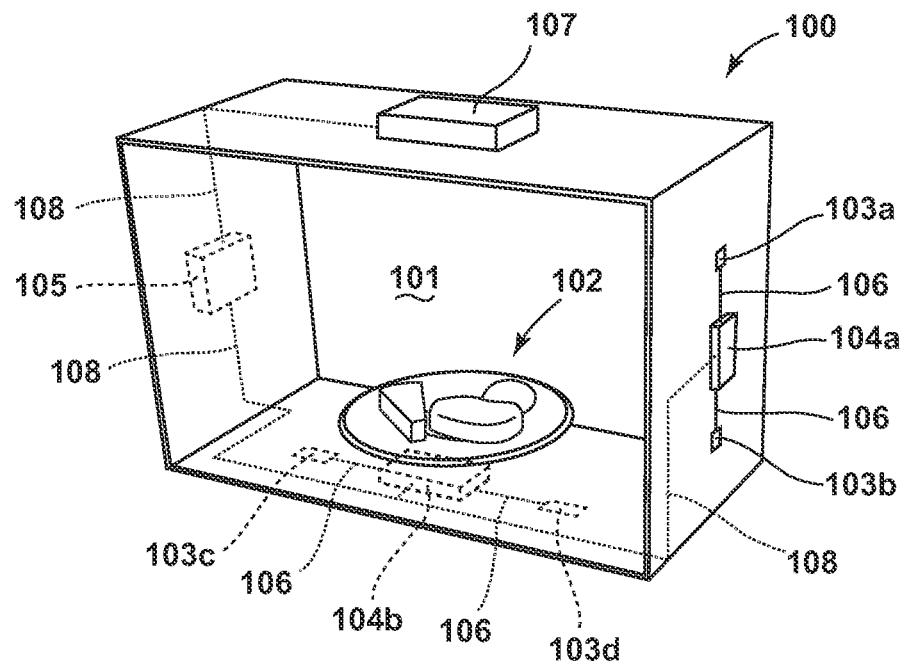
FIG. 1 schematically shows a microwave heating apparatus according to an embodiment of the present disclosure.

FIG. 1 shows a microwave heating apparatus 100 comprising a cavity 101 arranged to receive a load 102. The microwave heating apparatus 100 is equipped with a plurality of feeding ports 103a-d for feeding microwaves from a plurality of microwave generators 104a-b to the cavity 101. The microwave heating apparatus 100 is also equipped with a control unit 105 configured to obtain a desired temperature pattern 301 within the cavity 101 based on information about a plurality of regions 302a-h of the load 102, determine a heating pattern 303 comprising zones 304 of different intensities corresponding to the desired temperature pattern 301 and control at least some of the plurality of microwave generators 104a-b for providing the heating pattern 303 within the cavity 101.

For feeding microwaves from the microwave generators 104a-b to the cavity 101, the microwave heating apparatus 100 may also be equipped with transmission lines 106. The transmission lines 106 are arranged between the microwave generators 104a-b and the cavity 101 for feeding of microwaves via the feeding ports 103a-d. The microwave generators 104a-b are arranged at the respective first ends, or extremities, of the transmission lines 106 while the cavity 101 is arranged at the second ends, opposite to the first ends, of the transmission lines 106. The microwave generators 104a-b are adapted to generate microwaves, e.g. via their respective antennas (not shown), and the transmission lines 106 are configured to transmit the generated microwaves from the (antenna of the) microwave generators 104a-b to the cavity 101. The transmission lines 106 may be waveguides or coaxial cables.

In general, each of the microwave generators 104a-b may be associated with a dedicated feeding port 103a-d (and possibly with a dedicated transmission line 106) such that the power of the microwaves transmitted from each of the microwave generators 104a-b and, optionally, the power of the microwaves reflected to each one of the microwave generators 104a-b can be separately monitored.

A feeding port 103a-d may for instance be an antenna, such as a patch antenna or an H-loop antenna, or even an aperture in a wall (including sidewalls, the bottom and the ceiling) of the cavity 101. In the following, all these possible alternatives will be referred to simply as feeding ports.

In the present embodiment, there are two microwave generators 104a-b mounted on the outside of the walls of the cavity 101. The cavity or enclosure 101 has the shape of a rectangular parallelepiped, i.e. a shape similar to that of a box but with rectangles as faces instead of squares. One of the microwave generators 104a is mounted on the right wall of the cavity 101 and is connected by transmission lines 106 to two feeding ports 103a-b located at the right wall of the cavity 101. One of these feeding ports 103a is located in the upper part of the right wall, preferably centered along the horizontal direction of the wall while the other one of these feeding ports 103b is located in the lower part of the right wall, preferably centered along the horizontal direction of the wall. The second microwave generator 104b is mounted on the bottom wall of the cavity 101 and connected by transmission lines 106 to two feeding ports 103c-d located at the bottom wall of the cavity 101. One of these feeding ports 103c is located in the left part of the bottom wall, preferably centered similarly to the feeding ports 103a-b along the right wall. The other one of these feeding ports 103d is located in the right part of the bottom wall, preferably centered similarly to the feeding ports 103a-b along the right wall.

The arrangement of feeding ports 103a-d and microwave generators 104a-b described herein with reference to FIG. 1 is only provided as an example and is not limiting. It will be appreciated that more than two microwave generators 104a-b may be provided and also that the microwave heating apparatus 100 may include even more feeding ports 103a-d to provide flexibility in providing different heating patterns.

The cavity 101 of the microwave heating apparatus 100 defines an enclosing surface wherein one of the side walls of the cavity 101 may be equipped with a door (not shown in FIG. 1, but the door may suitably be arranged at the open side of the depicted cavity 101) for enabling the introduction of a load 102, e.g. a food item, in the cavity 101.

The microwaves generated by a microwave generator 104a-b and fed to the cavity 101 via its respective feeding ports 103a-d provide a mode field in the cavity 101. Mode fields provided by several microwave generators 104a-b may be combined to form a heating pattern in the cavity 101.

In general, the number and/or type of available mode fields in a cavity are determined by the design of the cavity. The design of a cavity comprises the physical dimensions of the cavity and the location of the feeding port(s) in the cavity. The dimensions of the cavity are generally provided by its height, depth and width. Further, when designing a cavity of a microwave heating apparatus, the impedance mismatch created between any transmission line and the cavity may be taken into account. For this purpose, the length of the transmission lines may also be slightly adjusted and the dimensions of the cavity tuned accordingly. During the tuning procedure, a load simulating a typical load to be arranged in the cavity may be present in the cavity. In addition, the tuning may be accomplished via local impedance adjustments, e.g., by introduction of a tuning element (such as a capacitive post) arranged in the transmission line or in the cavity, adjacent to the feeding port.

Advantageously, the control unit 105 may comprise, or may have the possibility to access, a look-up table or memory in which a number of parameters to operate (at least some of) the microwave generators 104a-b are known in order to obtain a specific heating pattern for typical loads 102. From such a look-up table, the control unit 105 may derive or compute the required microwave generators 104a-b and feeding ports 103a-d (and their operating parameters) in order to achieve a particular heating pattern (corresponding to a desired temperature pattern 301).

In general, the feeding ports 103a-d may be arranged at, in principle, any walls of the cavity 101. However, there is generally an optimized location of the feeding ports for a predefined mode field.

In the present embodiment, the cavity is designed to have the shape of a rectangular parallelepiped, e.g., with a width with order of about 450-500 mm, a depth of about 400 mm and a height of approximately 400 mm. However, this is just an example of the shape and size of the cavity 101. The cavity 101 may have many different shapes, such as a polyhedron, a cylinder, a sphere, etc. or combinations thereof.

In the present embodiment, the microwave heating apparatus 100 is equipped with an image-capturing device 107 arranged to acquire an image of the load 102 arranged in the cavity 101. The image-capturing device 107 is arranged to view the cavity 101 and the load 102 from above, acquiring images as that shown in FIG. 3a. The sensitivity of the image-capturing device may extend into the infrared range and, in such case, the microwave heating apparatus may include a processor or processing means for filtering the information obtained by the image-capturing device. In particular, the processor may be configured to filter the information (or signal) to reconstitute an image corresponding to the infrared part of the sensitivity of the device and another image corresponding to the visible part of the sensitivity of the device. The processor may be part of the image-capturing device or part of the control unit of the microwave heating apparatus. The filtering function of such processor is capable of distinguishing the part of the signal originating from the infrared part of the spectrum from the part of the signal originating from the visible part of the spectrum. The image-capturing device 107 may be mounted in a centralized position along the upper wall of the cavity 101, for having a good view of the interior of the cavity 101. The image-capturing device 107 may include a charge-coupled device, but may also include infrared sensors depending on the type of image to be acquired.

In the present embodiment, the control unit 105 is arranged on the outside of the left wall of the cavity 101. The control unit 105 may be connected by wires 108 to the microwave generators 104a-b for controlling them and to the image-capturing device 107 for receiving information about the load 102. The wires 108 may be replaced by other electrical connection means or even wireless communication.

In general, the image acquired by the image-capturing device 107 may either be sent directly to the control unit 105 using the wires 108 (or wireless communication) for subsequent analysis of the image, or the image-capturing device 107 may comprise image processing means for extracting information from the image, which information may then be sent to the control unit 105.

In the present embodiment, the image is sent as a digital signal to the control unit 105 which is equipped with a processor for acquiring information from the image. Using a grid 311, the control unit 105 may divide the image into a plurality of square-shaped regions representing regions 302a-h of the load 102. This is just an example of how an image may be divided into regions. Another possibility would be to divide the image using concentric circles and lines starting at the center of the circles in order to form a pattern similar to that of a dart board. Since the regions of the load may be of any possible shape, there are many different ways to divide the image into regions.

The image-capturing device 107 may be placed at any location along the walls of the cavity 101 in order to acquire images of the cavity 101 from different angles. These images may be used to distinguish the regions 302a-h of the load 102. Depending on the angle at which the images are acquired, the regions 302a-h of the load 102 may have different geometries. Moreover, a plurality of images acquired from different angles by different image-capturing devices 107 may be combined to form a three-dimensional representation of the load 102, which representation may be used to define the regions 302a-h of the load 102.

In the present example, the load 102 may comprise a piece of pie 305, a piece of meat 306 and a piece of bread 307, all placed on a plate 308 in the cavity 101. The square-shaped regions of the image in which the food lies represent the different regions 302a-h of the load 102. In particular, the regions denoted 302a-c correspond to parts of the bread 307, the regions denoted 302e-f correspond to parts of the piece of meat 306 and the regions denoted 302g-h correspond to parts of the piece of pie 305. The square-shaped regions of the image not overlapping the food are not considered to represent any regions 302a-h of the load 102, but instead correspond to parts of the cavity being empty (or possibly containing parts of the plate 308 which is not supposed to be heated).

Based on the image acquired by the image-capturing device 107, information about the regions 302a-h of the load 102 may be derived. In the present embodiment, the image-capturing device 107 includes a charge-coupled device whose sensitivity may extend into the infrared range. Thereby, the derived information may comprise information about the location in the cavity 101 of the regions 302a-h of the load 102, the food type of the regions 302a-h of the load 102 and the present temperature of the regions 302a-h of the load 102. Indeed, the food type may be determined based on the appearance of the food in the image, especially if the possible food types in the load are few and of different appearance. For example, the control unit 105 may comprise a memory in which a plurality of food types and associated visual appearances are listed. Comparing the regions 302a-h of the load 102 with such a list using image processing techniques, the control unit 105 may determine which food type is most likely to be present in each region 302a-h of the load 102.

Using the food type of a region 302a-h, the control unit 105 may then obtain a suitable finishing temperature or surface browning. For example, the control unit 105 may comprise a memory in which suitable finishing temperatures of different food types are stored. For this purpose, the control unit 105 may also be adapted to obtain a desired cooking level or cooking program, either via the image-capturing device 107 or via user entry (further explained below). Based on the desired finishing temperatures of the different regions 302a-h of the load 102, the control unit 105 may obtain a desired temperature pattern 301. Alternatively, the desired temperature of a region 302a-h is compared with the present temperature of that region 302a-h and the desired temperature pattern is then based on how much each region 302a-h needs to be heated in order to reach its desired finishing temperature, i.e. the temperature pattern may not be based solely on the desired finishing temperatures.

Figure 3A:
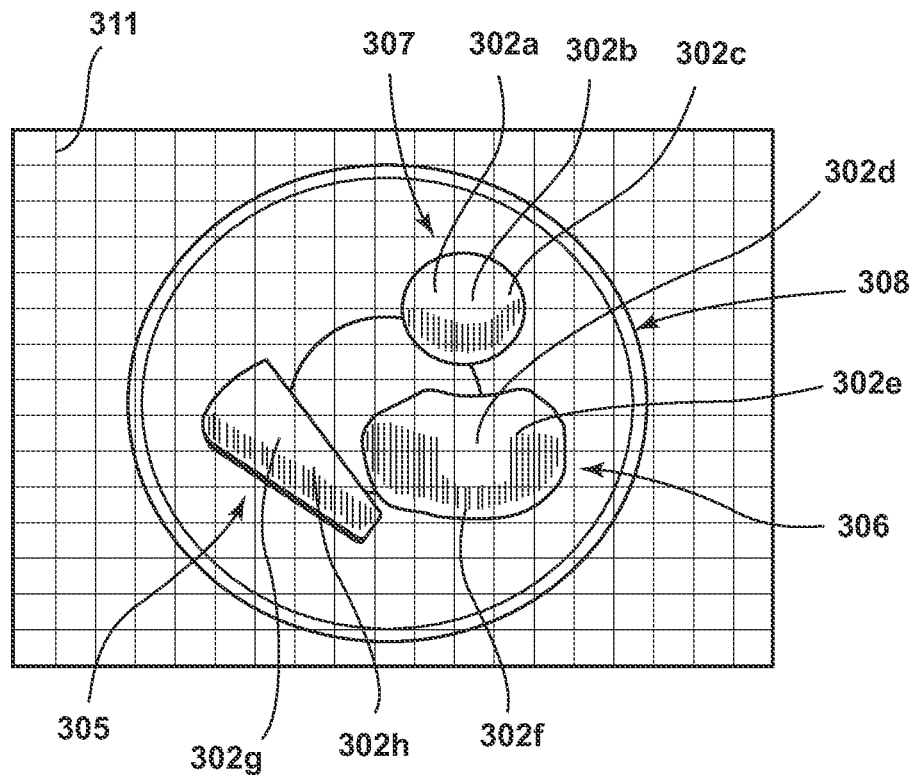
FIGS. 3a-c are schematic top views of the cavity of the microwave heating apparatus shown in FIGS. 1 and 2, which top views schematically show a plurality of regions of a load (FIG. 3a), an associated desired temperature pattern (FIG. 3b) and a corresponding heating pattern (FIG. 3c)
Figure 3B:
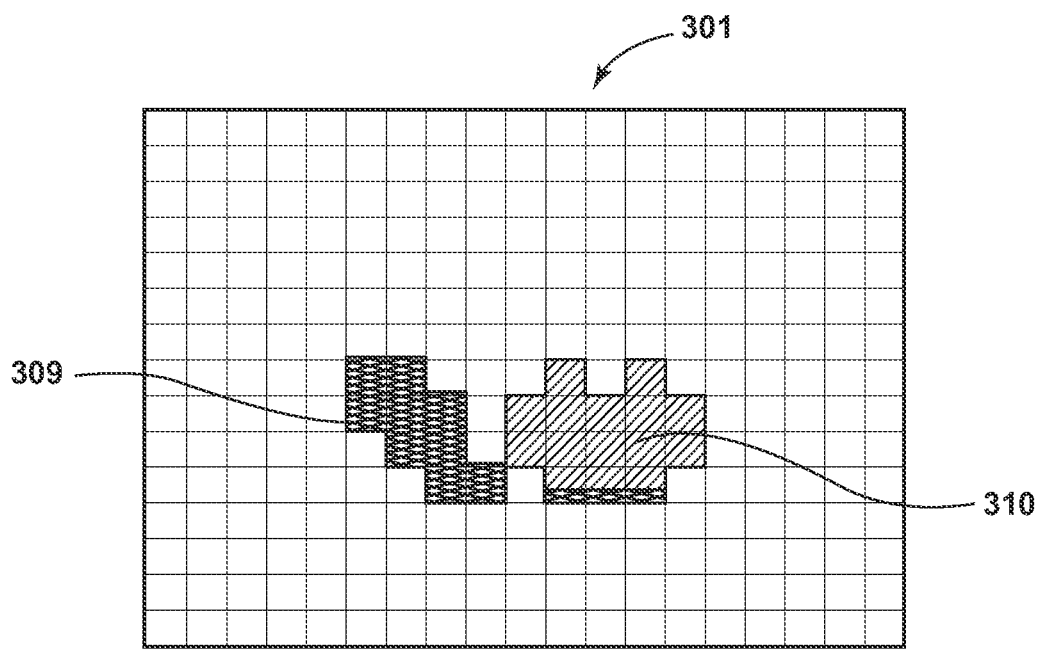

In FIG. 3b the desired temperature pattern 301 is visualized by a coloring of the regions 302a-h of the load 102 using a grayscale. The piece of pie is cold and the associated regions 302g-h need to be heated to a high extent. This is represented in the desired temperature pattern 301 by a coloring of the regions 302g-h of the load by a dark shade of gray 309. The piece of meat 306, on the other hand, is already quite warm, so the associated regions 302d-f only need to be heated a little. This is represented in the desired temperature pattern 301 by a coloring of the regions 302d-f of the load 102 by a bright shade of gray 310. The piece of bread 307 is not frozen, so the associated regions 302a-c do not need to be heated. This is represented in the desired temperature pattern 301 by the fact that there is no coloring of the regions 302a-c of the load 102.

In the present example, the desired temperature pattern 301 represents some kind of differential temperature pattern, i.e. how much a particular region needs to be heated, which then corresponds to the difference between the desired finishing temperature at a location and the current temperature of the load at this location.

However, in a simpler manner, the desired temperature pattern may directly correspond to the absolute desired finishing temperatures at the various regions of the load (i.e. not corresponding to a difference between such desired finishing temperature and a current temperature). Any necessary computation of the difference may be made by the control unit 105 just before determining the heating pattern.

Using the desired temperature pattern 301, the control unit 105 determines a heating pattern 303 with zones 304 of different intensities, suitable for heating the load 102 properly. For this purpose, the control unit 105 may comprise a memory in which different possible mode fields of the microwave generators 104a-b and associated feeding ports 103a-d are stored. In this memory, there may also be stored information about how these mode fields may be combined to form different heating patterns in the cavity 101. By comparing the desired temperature pattern 301 with heating patterns that may be obtained by combining the stored mode fields, the control unit may determine a suitable heating pattern 303 with zones 304 of different intensities corresponding to the desired temperature pattern 301.

Figure 3C:
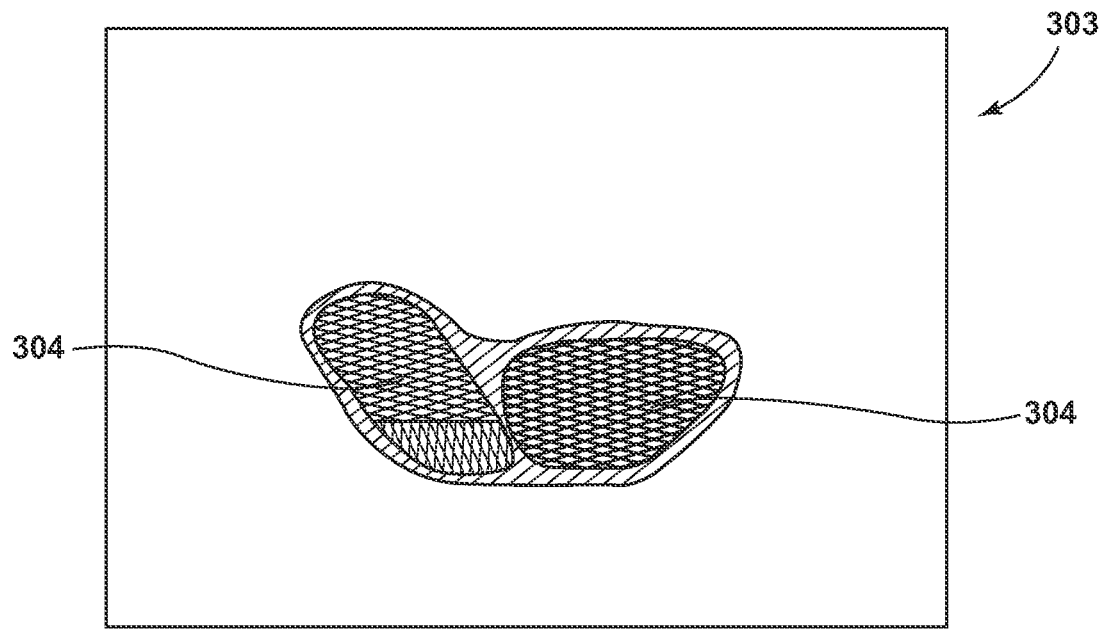

In FIG. 3c the determined heating pattern 303 is visualized by zones 304 colored by different shades of gray, representing different heating intensities corresponding to the piece of pie 305 and the piece of meat 306. It will be appreciated that the determined heating pattern 303 is not exactly similar to the desired temperature pattern 301 simply because it represents a heating pattern obtainable from mode fields available via the microwave generators 104a-b and the associated feeding ports 103a-d of cavity 101. Still, the determined heating pattern 303 matches the desired temperature pattern 301, thereby providing the desired heating of the load 102.

A zone 304 of the determined heating pattern 303 may correspond to many regions 302a-h of the load 102 with similar desired heating, i.e. the number of zones 304 may be much lower than the number of regions 302a-h of the load 102. In the present embodiment, all regions 302a-c of the load corresponding to the piece of pie 305 correspond to a single zone 304 in the determined heating pattern 303.

The control unit 105 then controls the different microwave generators 104a-b and the associated feeding ports 103a-d to provide mode fields that together form the determined heating pattern 303. Thereby, the load 102 is heated.

According to an embodiment, the microwave generators 104a-b may be solid-state microwave generators including e.g. a varactor diode (having a voltage-controlled capacitance). Solid-state based microwave generators may, for instance, comprise silicon carbide (SiC) or gallium nitride (GaN) components. Other semiconductor components may also be adapted to constitute the microwave generators 104a-b. In addition to the possibility of controlling the frequency of the generated microwaves, the advantages of a solid-state based microwave generator comprise the possibility of controlling the output power level of the generator and an inherent narrow-band feature. The frequencies of the microwaves that are emitted from a solid-state based generator usually constitute a narrow range of frequencies such as 2.4 to 2.5 GHz. However, the present disclosure is not limited to such a range of frequencies and the solid-state based microwave generators could be adapted to emit in a range centered at 915 MHz, for instance 875-955 MHz, or any other suitable range of frequency (or bandwidth). The embodiments described herein are for instance applicable for standard generators having mid-band frequencies of 915 MHz, 2450 MHz, 5800 MHz and 22.125 GHz. Alternatively, the microwave generators 104a-b may be frequency-controllable magnetrons such as disclosed in document GB2425415.

The use of solid state microwave generators or frequency-controllable microwave generators is advantageous in that it provides a highly adjustable heating pattern without the need of moving parts. The amplitude, the frequency and the phase of the microwaves emitted from the microwave generators 104a-b may be adjusted. Adjustment of the aforementioned parameters in the power supplies will affect the resulting heating patterns, thereby providing the possibility of adjusting the heating pattern provided in the cavity even more accurately and improving the matching between the determined heating pattern 303 and the desired temperature pattern 301.

For the purpose of regulation, the control unit 105 may be configured to control the frequency, the phase and/or the amplitude of the power from at least one of the microwave generators 104a-b for adjusting the heating pattern provided in the cavity 101. The microwave generators 104a-b may be independently controlled and independently operable.

Still for the purpose of regulation, the control unit 105 may be configured to receive information about measurements of the amount of microwaves reflected from the cavity 101.

Figure 2:
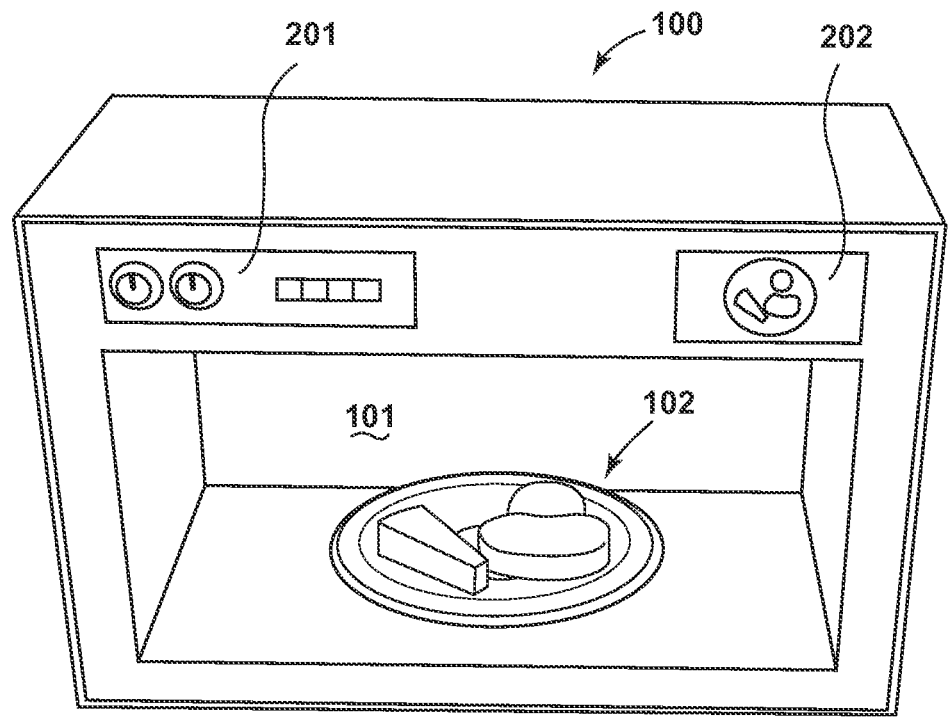
FIG. 2 schematically shows a microwave heating apparatus according to another embodiment of the present disclosure.

The microwave heating apparatus shown in FIG. 2 is similar to that shown in FIG. 1. The present microwave heating apparatus is a microwave oven for heating food items. As compared to the microwave heating apparatus described with reference to FIGS. 1 and 3a-h, the microwave oven 100 shown in FIG. 2 further comprises means 201 for entry of information such as locations of the regions 302a-h of the load 102 within the cavity 101, types of food corresponding to the regions 302a-h of the load 102, weights of the regions 302a-h of the load 102, volumes of the regions 302a-h of the load 102, instantaneous temperatures of the regions 302a-h of the load or desired finishing temperatures for the regions 302a-h of the load 102 or a selected cooking program.

The microwave oven 100 has a front door with a window for allowing the user to see the load 102 arranged in the cavity 101. The means 201 for entry of information is located above the window and comprises a plurality of buttons that may be used by the user to enter information about the load 102 and how it should be heated. The user may enter information about the regions 302a-h of the load 102, one after another, indicating which type of information is being entered and to which region 302a-h of the load the information is supposed to be associated. The entered information is sent by electrical connection means to the control unit 105 which optionally may combine this information with information gathered from the image obtained by the image-capturing device 107 in order to obtain a desired temperature pattern 301.

In the present embodiment, the microwave oven 100 further comprises a display screen 202 for displaying the load 102 located in the cavity 101. The display screen 202 is located above the window and may be a touch sensitive screen. In that case, the display screen 202 may also be used for entry of information. For example, the user may press certain parts of the display screen 202 corresponding to regions 302a-h of the load 102, to indicate that new information about these regions 302a-h of the load 102 will be entered. The user may then use the means 201 for entry (the buttons) to input information about the indicated regions 302a-h of the load 102. Alternatively, a menu for selection of options may open on the touch screen, thereby enabling selection of, e.g., finishing temperature or state (or even cooking level such as "well done" or "medium rare" for a piece of meat.)

Figure 4:
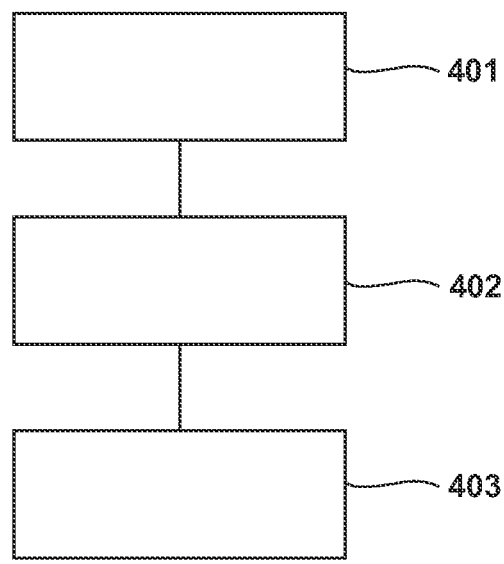
FIG. 4 is a general outline of a method of heating a load using microwaves in accordance with an embodiment present disclosure.

With reference to FIG. 4, a method for heating a load using microwaves is described in accordance with an embodiment of the present disclosure. The same reference numbers as for the features of the microwave heating apparatus described with reference to FIGS. 1 and 3a-h are used in the following.

The method comprises the step 401 of obtaining a desired temperature pattern 301 for a plurality of regions 302a-h of the load 102, the step 402 of determining a heating pattern 303 with zones 304 of different intensities corresponding to the temperature pattern 301, and the step 403 of heating the load 102 with the determined heating pattern 301 in the cavity 101.

Further, it will be appreciated that any one of the embodiments described above with reference to FIGS. 1, 2 and 3a-c is combinable and applicable to the method described herein with reference to FIG. 4.

The present disclosure is applicable for domestic appliances such as a microwave oven using microwaves for heating. The present disclosure is also applicable for larger industrial appliances found in, e.g., food operation. The present disclosure is also applicable for vending machines or any other dedicated applications.

While specific embodiments have been described, the skilled person will understand that various modifications and alterations are conceivable within the scope as defined in the appended claims.

For example, although the microwave heating apparatus 100 described with reference to the FIGS. 1, 2 and 3a-c comprise two microwave generators 104a-b and four feeding ports 103a-d, it will be appreciated that these numbers are just examples, by no means limiting the different possible combinations of microwave generators 104a-b and feeding ports 103a-d. It will be understood by one having ordinary skill in the art that construction of the described device and other components is not limited to any specific material. Other exemplary embodiments of the device disclosed herein may be formed from a wide variety of materials, unless described otherwise herein.

Referring now to FIGS. 5-15, which include separate reference numbers, except where specifically indicated, the reference numeral 510 generally refers to an alternate embodiment of a microwave heating apparatus 510 that includes a cavity 512 arranged to receive a load 514 and at least one microwave generator 516 configured to feed a plurality of microwaves 518 into the cavity 512. The microwave heating apparatus 510 also includes at least one image-capturing device 520 and a control unit 522. The control unit 522 is adapted to obtain load volume information 524 of the load 514 placed within the cavity 512 based upon information recorded by the image-capturing device 520 about at least one portion of the load 514. The control unit 522 is also adapted to obtain load density information 526 using at least one of a user input and the information recorded by the image-capturing device 520 about at least one portion of the load 514. The control unit 522 is further adapted to determine load mass information 528 based upon the load volume information 524 and the load density information 526. The control unit 522 is further adapted to determine a heating pattern 530 based upon the load mass information 528 and control the at least one microwave generator 516 to provide the heating pattern 530 within the cavity 512.

Figure 5:
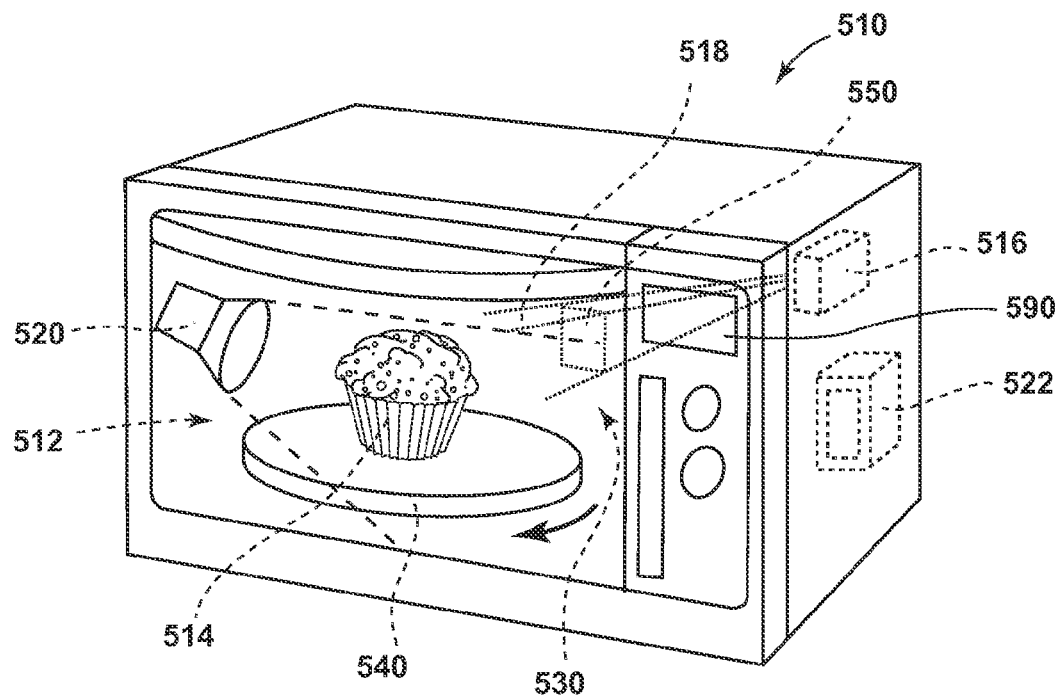
FIG. 5 is a front top perspective view of a microwave heating apparatus with a load placed within the cavity.
Figure 6:
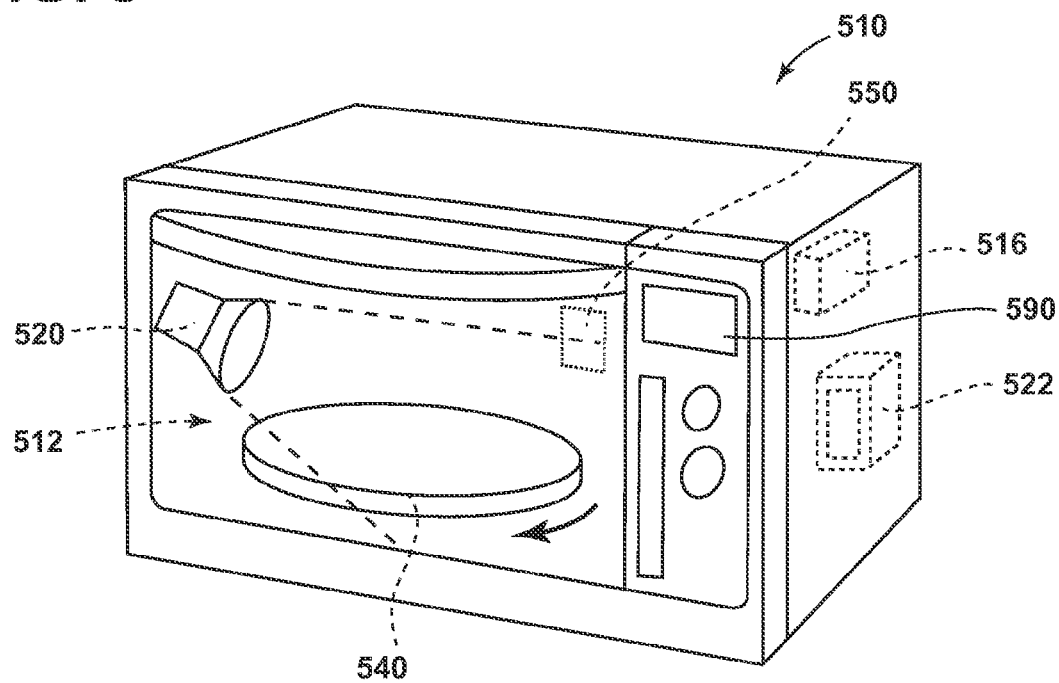
FIG. 6 is a front perspective view of the microwave heating apparatus of FIG. 5 with the load removed from the cavity.

As shown in the embodiment of FIGS. 5-6, the microwave heating apparatus 510 can include one or more image-capturing devices 520. Where a single image-capturing device 520 is included, the microwave heating apparatus 510 will generally also include a turntable 540 onto which the load 514 can be placed, wherein the turntable 540 can spin the load 514 within the cavity 512, such that the image-capturing device 520 can capture images 542 of the load 514 from a plurality of angles and perspectives, as the load 514 is rotated, to gather as much information about the load 514 as is necessary to make the appropriate calculations. In various embodiments, it is contemplated that the microwave heating apparatus 510 can include a plurality of image-capturing devices 520 that are spaced throughout portions of the microwave heating apparatus 510 to capture a plurality of simultaneous images 542 of the load 514 from different angles. In this manner, information about the load 514 can be captured while the load 514 is stationary, or simultaneous sets of information from multiple views can be gathered while the load 514 is rotating on the turntable 540 placed within the cavity 512. The image-capturing device 520 can include various cameras and sensors that can include, but are not limited to, color cameras, thermal imaging devices, image digitizing devices, and other similar image-capturing devices 520 that are configured to gather information about the outer surface of the load 514.

In various embodiments, the microwave generator 516 can include a plurality of microwave generators 516. It is contemplated that each of the one or more microwave generators 516 is configured to deliver the plurality of microwaves 518 to the cavity 512 through respective microwave ports 550 (shown in FIGS. 5 and 6). It is contemplated that in an embodiment where the cavity 512 includes a plurality of microwave ports 550, the various microwave ports 550 can be operable to substantially control or regulate the admission of a plurality of microwaves 518 into the cavity 512 of the microwave heating apparatus 510. In various alternate embodiments, the control unit 522 can be configured to regulate the various microwave generators 516, such that the appropriate amount of microwaves 518 are admitted into the cavity 512 during performance of the heating pattern 530.

Referring again to the embodiment of FIGS. 5-8, the load volume information 524 and surface information of the load 514 is captured through the use of the image-capturing device 520, where the image-capturing device 520 captures several images 542 of the load 514 from varying perspectives. For each image 542, the control unit 522, or another separate processing device, is configured to separate the foreground portions 560 of the image 542 containing information regarding the load 514, from the background portions 562 of the image 542, which contain information about the interior surface of the microwave heating apparatus 510 that defines the cavity 512. In the various embodiments, the image-capturing device 520 can be pre-calibrated such that the locations in space can be mapped to pixel 572 locations in the image. Other embodiments consider the image-capturing device 520 to be able to self-calibrate by using fiducial markers such as circles, points or lines inscribed in the cavity 520 walls.

Figure 7:
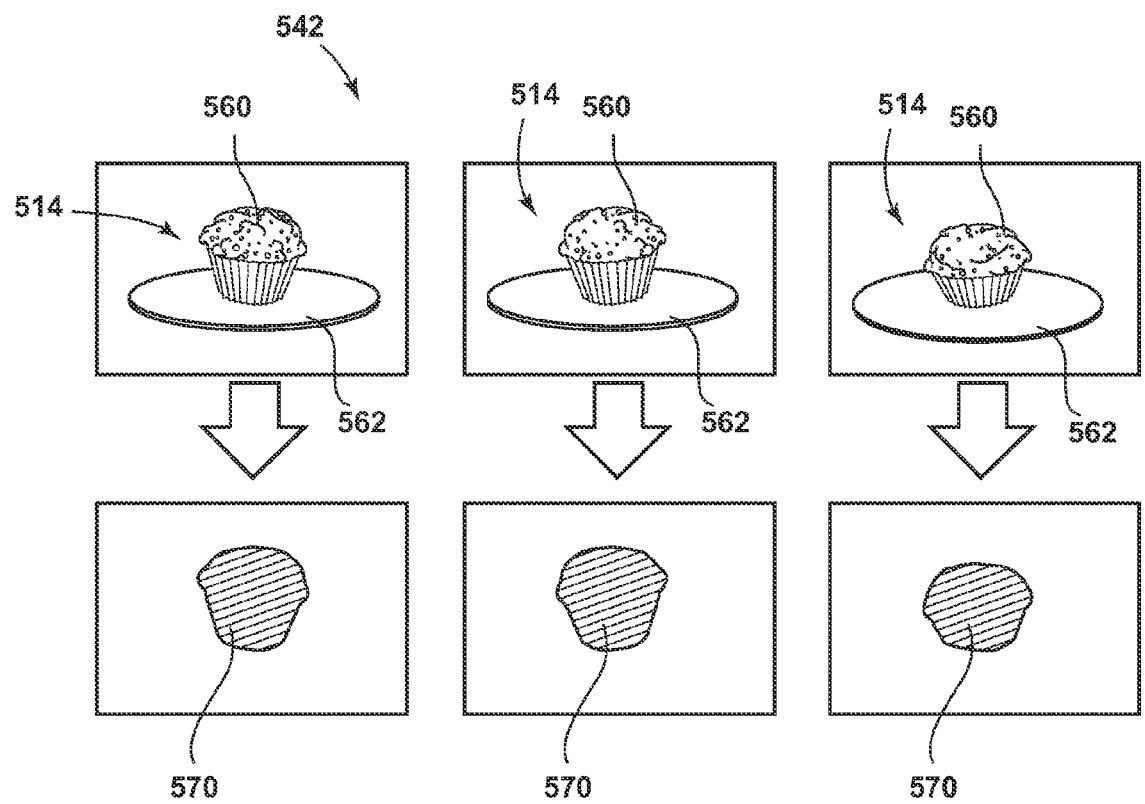
FIG. 7 is a schematic representation of the plurality of images that are used to make a plurality of image silhouettes.
Figure 8:
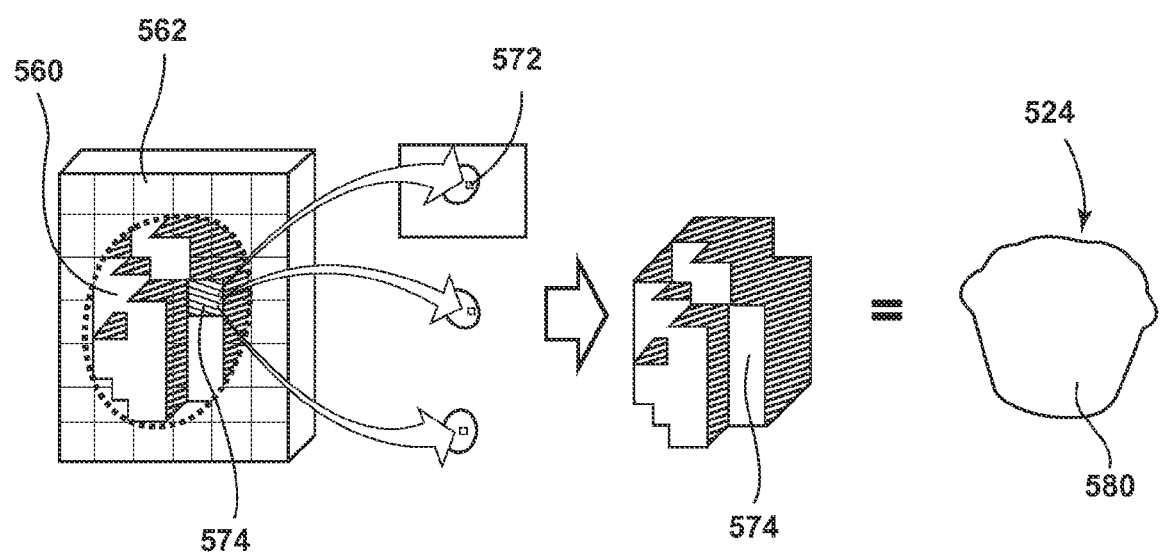
FIG. 8 is a schematic diagram of the back-projection process to construct the three-dimensional shape of the load placed within the cavity.
Figure 9:
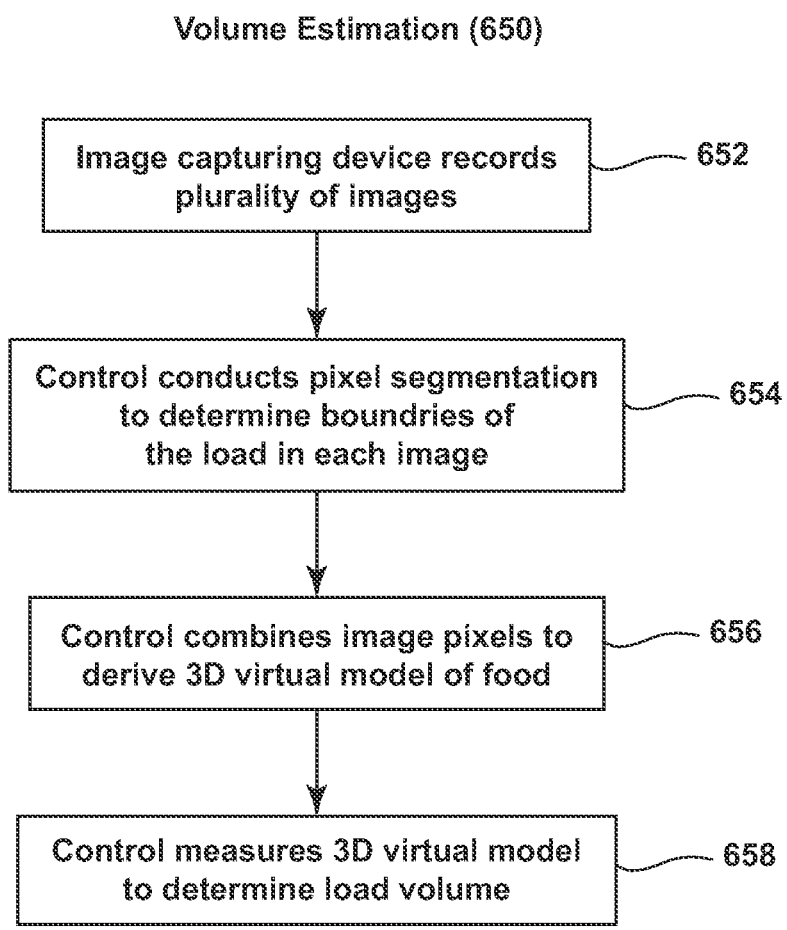
FIG. 9 is a schematic flow chart diagram showing the process of converting the plurality of images captured by the image-capturing device into a measurable 3D virtual model to determine the load volume information.

Referring now to the embodiment of FIGS. 7-9, the plurality of images 542 captured by the image-capturing device 520 (step 652) of method 650 are combined to form two-dimensional silhouettes 570 of the load 514 placed within the cavity 512.

Referring again to the embodiment of FIGS. 5 and 7-9, a series of two-dimensional silhouettes 570 are constructed using a plurality of images 542. Each of the silhouettes 570 can be obtained by separation or segmentation, using various background subtraction techniques (step 654). In this manner, the segmentation process discriminates between foreground portions 560 of the image 542 that, typically, change between the plurality of images 542 (i.e., the load 514) from the substantially unchanged background portions 562 of the image 542 (i.e., the turntable 540 and other portions of the microwave heating apparatus 510). The objective of the segmentation process is to determine foreground portions 560 of the image 542 that correspond to the load 514. This allows the control unit 522 to determine the locations within each image 542 that belong to the load 514 for each of the images 542. The control unit 522 can determine the correspondence between a location in space and a respective pixel 572 location in each of the plurality of images 542 using the calibration information from the image-capturing device 520. Put another way, the control unit 522 communicates the 3D intersections of the various views of the load 514 in order to estimate its surface contours. This process can also be referred to as a back-projection process, wherein voxels 574 representing physical space locations in the cavity 512 are projected to pixels 572 in the plurality of images 542 corresponding to the pre-calibrated views of the various portions of the microwave heating cavity 512. The voxels 574 corresponding to portions of the load 514 are determined from the segmentation process (i.e., a voxel 574 corresponding to a portion of the load should be contained in all and each of the two-dimensional silhouettes 570). This process, also known as space carving, combines all of the pixels 572 in the silhouettes 570 to form an array of voxels 574 corresponding to the shape of the three-dimensional object being the load 514 (step 656).

In various embodiments, as illustrated in FIGS. 7-9, the space-carved array of voxels 574 could be in the form of a wire frame model, a triangular mesh model, a 3D surface model, or other similar digitally formed virtual image 542 that can be measured to determine various parameters of the load 514. These parameters can include, but are not limited to, volume, texture, shape, surface temperature, color, and other similar surface-related conditions. In the various embodiments, the load volume information 524 can be obtained by counting all of the foreground portions 560 from the array of voxels 574 and multiplying by the corresponding volumetric value (obtained from calibration data) for each voxel 574. Similar techniques comprising the creation of wireframe images, surface images, or other digital images through which the volume of the load 514 can be measured (step 658) can also be implemented.

Figure 10:
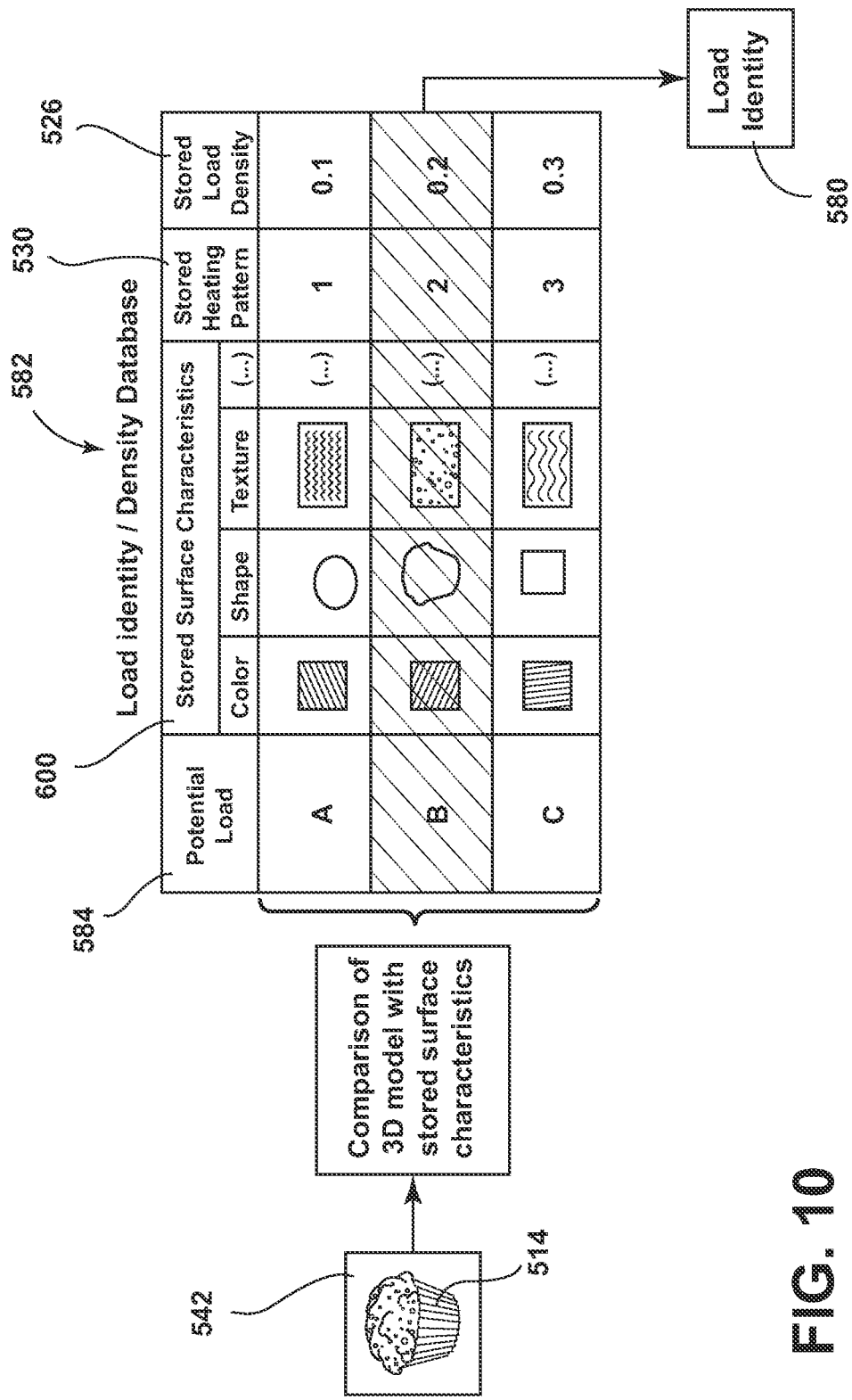
FIG. 10 is a schematic diagram of the load identity/density database that can be used to determine load density information based upon the load identity information.
Figure 11:
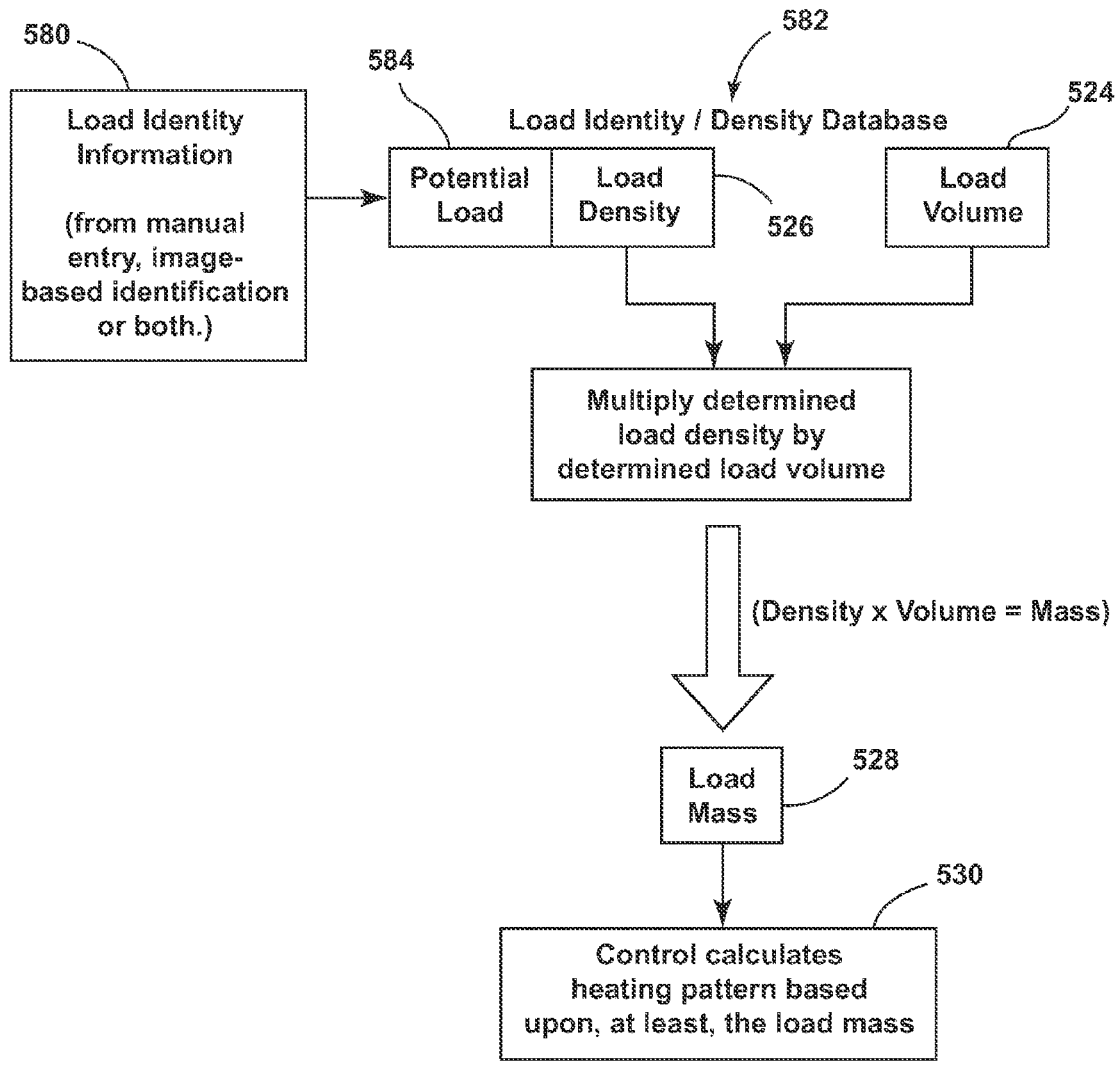
FIG. 11 is a schematic diagram showing the process of using load identity information, load density information and load volume information to determine the load mass information and the resulting heating pattern.
Figure 12:
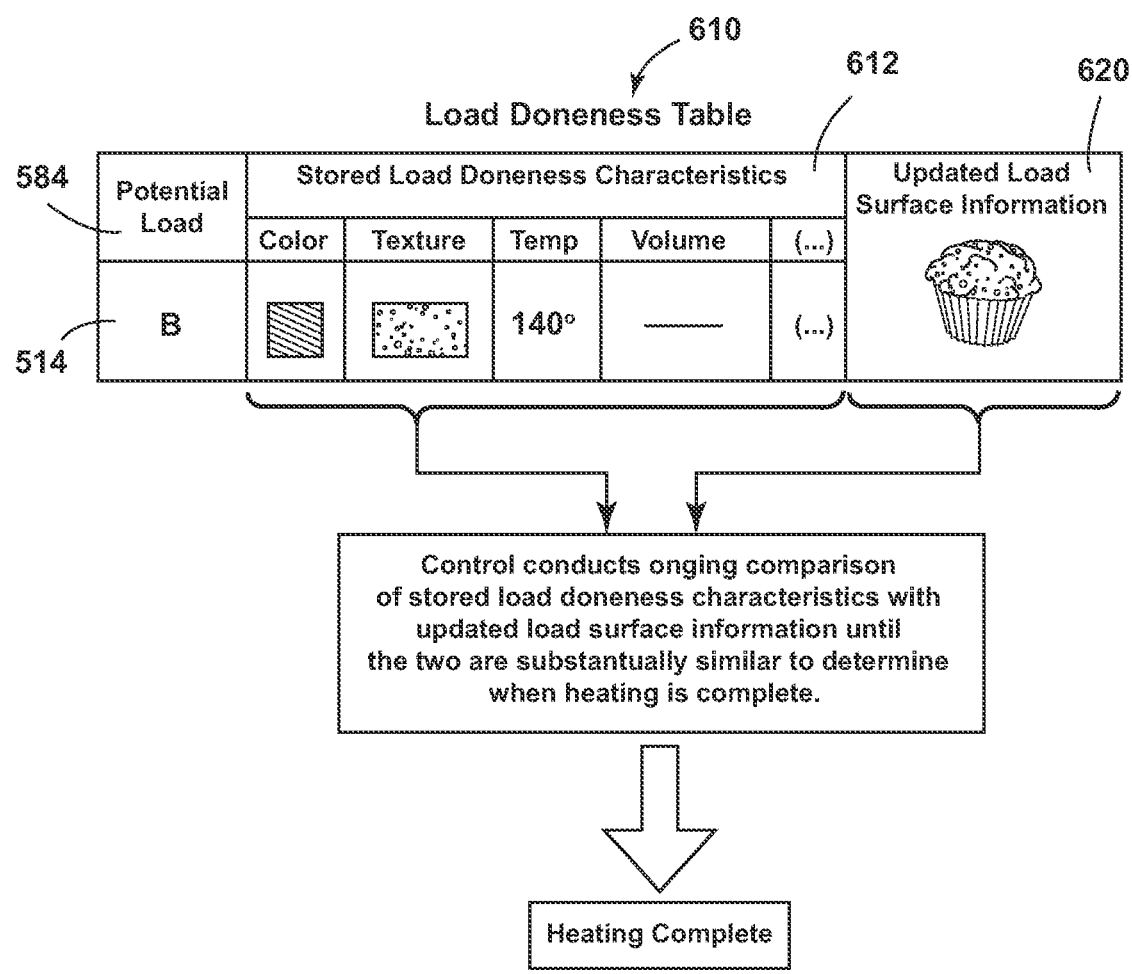
FIG. 12 is a schematic diagram of one embodiment of the load doneness table that is used to compare updated load surface information with stored load doneness characteristics to determine whether heating of the load is complete.

As illustrated in the embodiment of FIGS. 5 and 10-11, in addition to the load volume information 524, the load density information 526 of the load 514 is needed to determine the mass of the load 514. In various embodiments, load identity information 580 is captured and the load identity information 580 is compared with a load identity/density database 582 including data regarding the identities of various potential loads 584 and corresponding load density information 526 that corresponds to each of the potential loads 584. The control unit 522 is adapted to obtain the load density information 526 by comparing the load identity information 580 to the density data contained within the load identity/density database 582. In the various embodiments, the load identity information 580 can be determined by either a manual user input or information gathered by the image-capturing device 520 as to at least a portion of the load 514.

Referring again to the embodiment illustrated in FIGS. 5, 10 and 11, the microwave heating apparatus 510 can include a user interface 590 (shown in FIGS. 5 and 6), such as a keypad, touchscreen, or other similar user interface 590 through which the user can input various load data including the type or types of food inserted within the cavity 512 that constitute the load 514. Once this information is manually input, the control unit 522 compares the input information with the load density information 526 contained within the load identity/density database 582, and provides corresponding load density information 526 that, when multiplied by the load volume information 524, provides the load mass information 528. The load mass information 528 obtained is then used to determine a heating pattern 530 that is appropriate for the load 514. The heating pattern 530 can include a power-level pattern, a cook-time pattern, intermittent changes to these patterns, and other various patterns that are configured to control the operation of the microwave generator 516.

As shown in the embodiment of FIGS. 5-9 and 10, the identity of the load 514 placed within the cavity 512 can also be determined automatically through use of the image-capturing device 520. As the imaging capturing device 520 is used to determine the load volume information 524, or during a separate process, various images 542 captured by the image-capturing device 520 can be used to determine the appropriate load identity information 580. Accordingly, load identify information 580 and surface information such as color, texture, shape, surface temperature and other parameters are recorded and compared with a load identity/density database 582 that includes stored surface characteristics 600 of one or more potential loads 584 and corresponding image and parameter information regarding the characteristics of various foods that may be placed within the cavity 512. The control unit 522 compares the plurality of images 542 with the stored surface characteristics 600 contained within the load identity/density database 582 to determine the various foods that are placed within the cavity 512 that constitute the load 514.

In various embodiments, when the control unit 522 finds a match between the various parameters included within the plurality of images 542, and the load identity/density database 582, the user interface 590 disposed on a portion of the microwave heating apparatus 510 can indicate the food types contained within the load 514. It is contemplated that the user can be given an option to override the determination of the control unit 522 to more precisely define the foods contained within the load 514. It is also contemplated that where the control is only able to narrow down the identity of the load 514 to two or more potential loads 584, the user can be given the option to select the appropriate load identity information 580 or, in the alternative, to override the determination of the control unit 522 altogether, as described above. Once the determination of the load identity information 580 is made, the load identity information 580 is compared with the load identity/density database 582, to arrive at the load density information 526. As discussed above, the load density information 526 is combined with the load volume information 524 to arrive at the load mass information 528. The load mass information 528 is then used to determine the appropriate heating pattern 530 to be used to heat the load 514 within the cavity 512.

Referring now to the embodiment illustrated in FIGS. 5-8, 10 and 12, the load identity/image database 582 can also include a load doneness table 610 containing information regarding the doneness characteristics of each potential load 584, wherein the doneness characteristics include various load parameters that are present when a particular food is substantially finished being heated. By way of explanation, and not limitation, when fluids are boiled within the microwave heating apparatus 510, the shape of the top surface of the fluid changes rapidly and dramatically as a result of the effects of being boiled. Also, various baked goods, when cooked, may change from a batter having a smooth surface to a baked good that has, typically, increased in volume and also includes a more textured surface reflecting the top surface of a baked good, such as a cake, muffin, or other similar baked good. Additionally, various prepared microwave meals, such as popcorn, microwave dinners, and other similar prepared foods can have packaging that changes volume as it is cooked, or is configured to release steam during the cooking process. These various changes in the characteristics of the load 514 can be included within the load identity/density database 582 as stored load doneness characteristics 612 of each potential load 584.

Referring again to the embodiment illustrated in FIGS. 5-8, 10 and 12, during the cooking process, the control unit 522 is further adapted to collect load surface information from the image-capturing device 520 that is updated during performance of the heating pattern 530. The control unit 522 collects updated load surface information 620 at substantially regular time intervals and compares the updated load surface information 620 with the stored load doneness characteristics 612 contained within the load identity/density database 582, wherein the load identity/density database 582 includes a load doneness table 610 having information regarding the load doneness characteristics 612 that corresponds to the various foods contained within the load 514. During this process, the image-capturing device 520 records the updated load surface information 620 by taking various images 542 of the load 514 at regular intervals to record the process of performing the heating pattern 530. Various changes within the characteristics of the load 514, such as changes in texture, size, shape, temperature, volume, and other parameters, are recorded by the image-capturing device 520 and delivered to the control unit 522. The control unit 522 then compares the updated load surface information 620 with the information contained within the stored load doneness table 610. When the updated load surface information 620 is substantially similar to the corresponding stored load doneness characteristics 612, the control unit 522 is configured to terminate the heating pattern 530.

In various embodiments, it is contemplated that the heating pattern 530 can be determined according to information contained within the load doneness table 610, wherein a certain food contained within the load 514 includes a corresponding heating pattern 530, such as the power-level pattern, the cook-time pattern, and other various patterns included within the heating pattern 530. In this manner, once the load 514 is identified, the heating pattern 530 is determined at least on the basis of the load identity information 580 of the particular load 514.

Referring again to the embodiment of FIGS. 5-12, in embodiments where the heating pattern 530 is determined based upon the load mass information 528, as described above, it is contemplated that the stored load doneness characteristics 612, and the updated load surface information 620, as compared to the stored load doneness characteristics 612, can be used as an override to cut short a previously determined heating pattern 530. In this manner, after the load mass information 528 is determined and the heating pattern 530 is derived and initiated, the image-capturing device 520 continually captures the updated load surface information 620 at regular intervals. During performance of the heating pattern 530, the updated load surface information 620 is compared with the stored load doneness characteristics 612. Where the heating pattern 530 is not yet complete, but the updated load surface information 620 is substantially similar to the corresponding stored load doneness characteristics 612, the control unit 522 can override the predetermined heating pattern 530 and terminate the heating pattern 530 early. Additionally, where the heating pattern 530 is complete and the updated load surface information 620, when compared to the stored load doneness characteristics 612, indicates that the load 514 is not yet done cooking, the control unit 522 can override the heating pattern 530 and extend the heating pattern 530 until such time as the updated load surface information 620 substantially matches the corresponding stored load doneness characteristics 612 within the load doneness table 610. As discussed above, the stored load doneness characteristics 612 can include at least one of load color, load shape, load volume, load texture and load temperature, among other characteristics.

Figure 13:
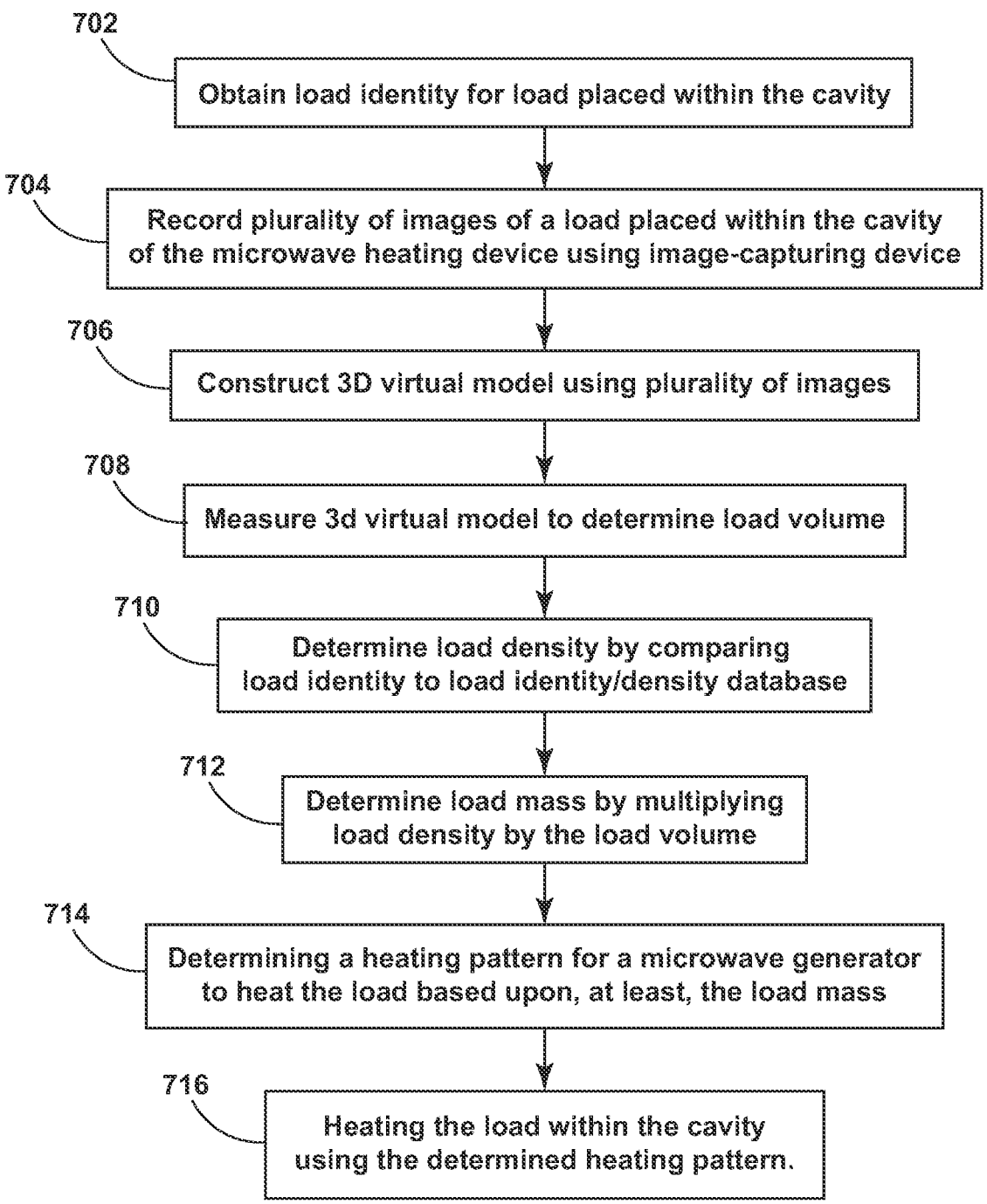
FIG. 13 is a schematic flow diagram illustrating a method for heating a load placed within a cavity of a microwave heating appliance.

Having described the microwave heating device and referring now to the embodiment illustrated in FIG. 13, a method 700 is described for heating a load 514 within the cavity 512 using microwaves 518 using the microwave heating apparatus 510 described above. This method 700 includes obtaining a load identity for a load 514 placed within the cavity 512 (step 702). As discussed above, the step of obtaining the load identity can include using a manual identity input wherein the user inputs the name of various characteristics within the load 514. Alternatively, the load identity can be input automatically through the use of the plurality of images 542 using an image-capturing device 520 (step 704). Where the image-capturing device 520 is used to identify the load 514, the image-capturing device 520 can capture various characteristics and parameters of the load 514 that can include, but are not limited to, color, texture, temperature, shape, volume, and other similar characteristics and parameters.

As illustrated in the embodiment of FIG. 13, the control unit 522 uses the images 542 to construct a 3D model (step 706). The control unit 522 also obtains the load volume for the load 514 by measuring the 3D model unit (step 708). As discussed above, the control uses the images 542 captured by the image-capturing device 520 to create various image silhouettes 570 and uses the back-projection process to separate or segment pixels 572 defined within the boundaries of the load silhouette 570 from those pixels 572 outside of the load silhouette 570 that define portions of the inner surface of the microwave heating apparatus 510, which defines a cavity 512. The back-projection process can also use various data points identified within the load 514 or within the load silhouette 570, wherein these data points are combined between the plurality of images 542 to reconstruct the shape of the load 514 into a wire frame model, surface model, or other virtual image 542 through which the load volume can be calculated.

As further illustrated in the embodiment of FIG. 13, the method 700 includes using the load identity information 580 to determine the load density information 526 (step 710). As discussed above, once the load identity is determined, either manually, automatically, or by a combination of automatic and manual inputs, the load identity is compared with the load identity/density database 582 to recall the appropriate load density information 526 that corresponds to the density load. The control then determines the load mass using the load volume and corresponding load density (step 712). Typically, load mass is determined by multiplying the load volume by the load density. In various embodiments, the load mass can be different within various portions of the load 514, such as when different foods are contained within the load 514. A less dense food, such as bread, may be contained within the same load 514 as a piece of meat, which is generally more dense. Typically, foods that are more dense require additional heating or greater amounts of microwaves 518 than foods that are less dense in order to achieve the proper heating levels for consumption. In this manner, the determination of the various densities of the load 514 can also be used to separate the load 514 into various quadrants that may require individualized heating patterns 530 based upon the densities of the various portions of the load 514. Accordingly, the control unit 522 can determine a heating pattern 530 for the load 514 based upon at least the load mass (step 714), this process can also include determining the locations of various portions of the load 514. In this manner, the heating pattern 530 can include a power-level pattern, a cook-time pattern, as well as a load-region pattern within which varying levels of microwaves 518 are delivered to corresponding portions of the load 514. After the heating pattern 530 is derived, the control unit 522 heats (step 716) the load 514 placed within the cavity 512 using the determined heating pattern 530 (step 716).

Figure 14:
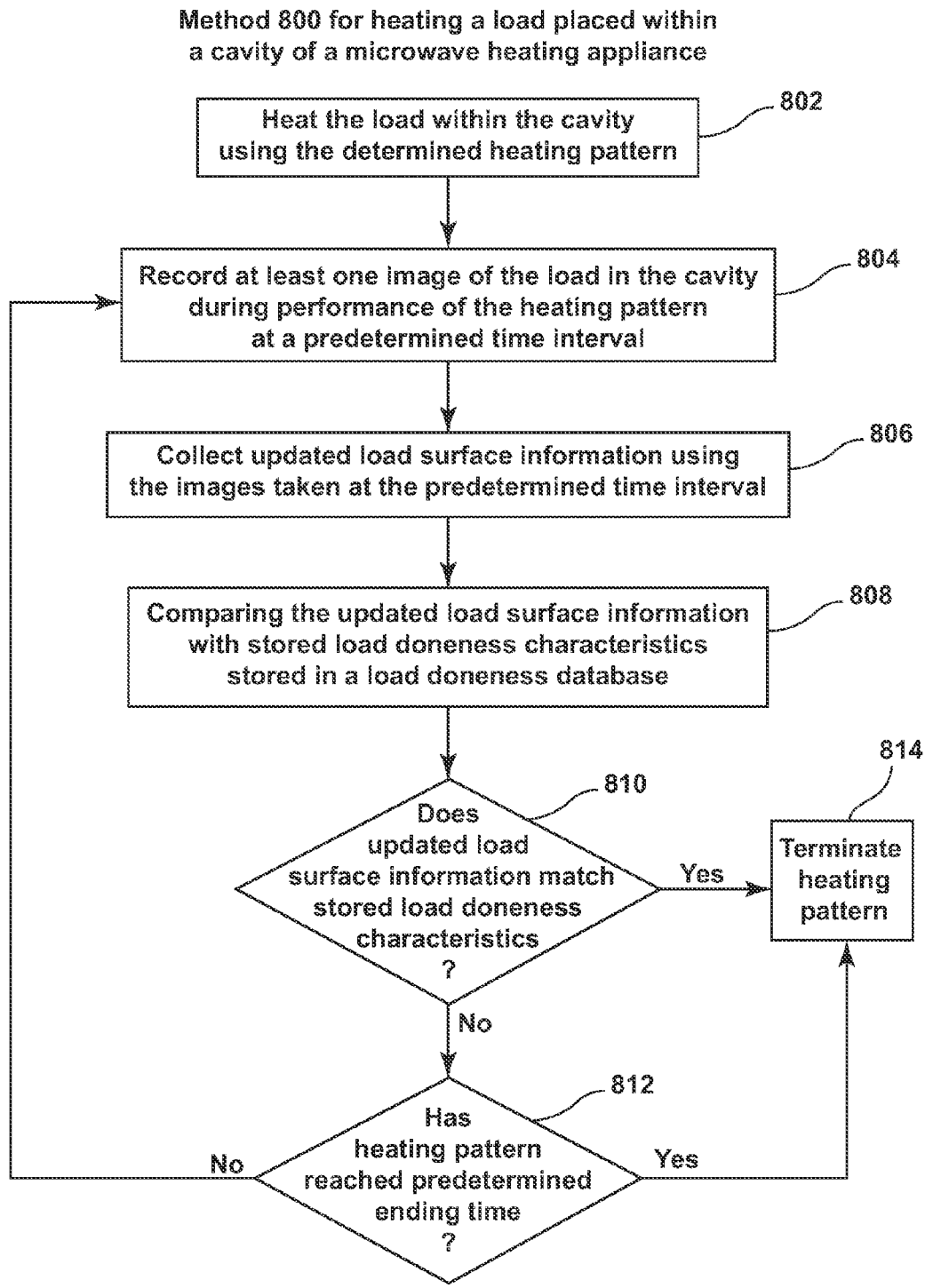
FIG. 14 is a schematic flow diagram illustrating an alternate method for heating a load placed within a cavity of a microwave heating appliance.

Referring now to the embodiment illustrated in an embodiment of FIG. 14, a method 800 for heating a load 514 placed within the cavity 512 includes heating the load 514 using a predetermined heating pattern 530 (step 802). The method 800 also includes collecting load surface information from the image-capturing device 520 during performance of the heating pattern 530 (step 804). The control unit 522 then collects updated load surface information 620 at substantially regular time intervals (step 806). As discussed above, during performance of the heating pattern 530, the image-capturing device 520, or the plurality of image-capturing devices 520, record information concerning the surface conditions of the load 514. This surface information can include the load color, the load volume, the load shape, the load texture, the load temperature, and other various parameters contained within the surface of the load 514. The control, in turn, collects and monitors this surface information. The method 800 further includes comparing the updated load surface information 620 with the load doneness characteristics 612 stored within the load doneness table 610 (step 808), wherein the load doneness table 610 includes the identities of various potential loads 584, corresponding load doneness characteristics 612, and other similar information relating to the cooking process of the various potential loads 584. The control unit 522 uses the updated load surface information 620 and the stored load doneness characteristics 612 and compares the two to determine when the updated load surface information 620 is substantially similar to the corresponding load doneness characteristics 612 (step 810). Where the updated load surface information 620 is substantially similar to the corresponding load doneness information, the control unit 522 terminates the heating pattern 530 (step 814). As discussed above, the comparison of the updated load surface information 620 and the corresponding load doneness characteristics 612 can be used to override a predetermined heating pattern 530 to cut short or extend the heating pattern 530 until such time as the updated load surface information 620 is substantially similar to the corresponding load doneness characteristics 612. If the updated load surface information 620 is not similar to the stored load doneness characteristics 612, the control unit 522 can determine whatever the heating pattern 530 has reached its predetermined end (step 812). If it has, the heating pattern 530 is terminated (step 814). If not ended, the control unit 522 again records updated load surface information 620 (step 804).

Figure 15:
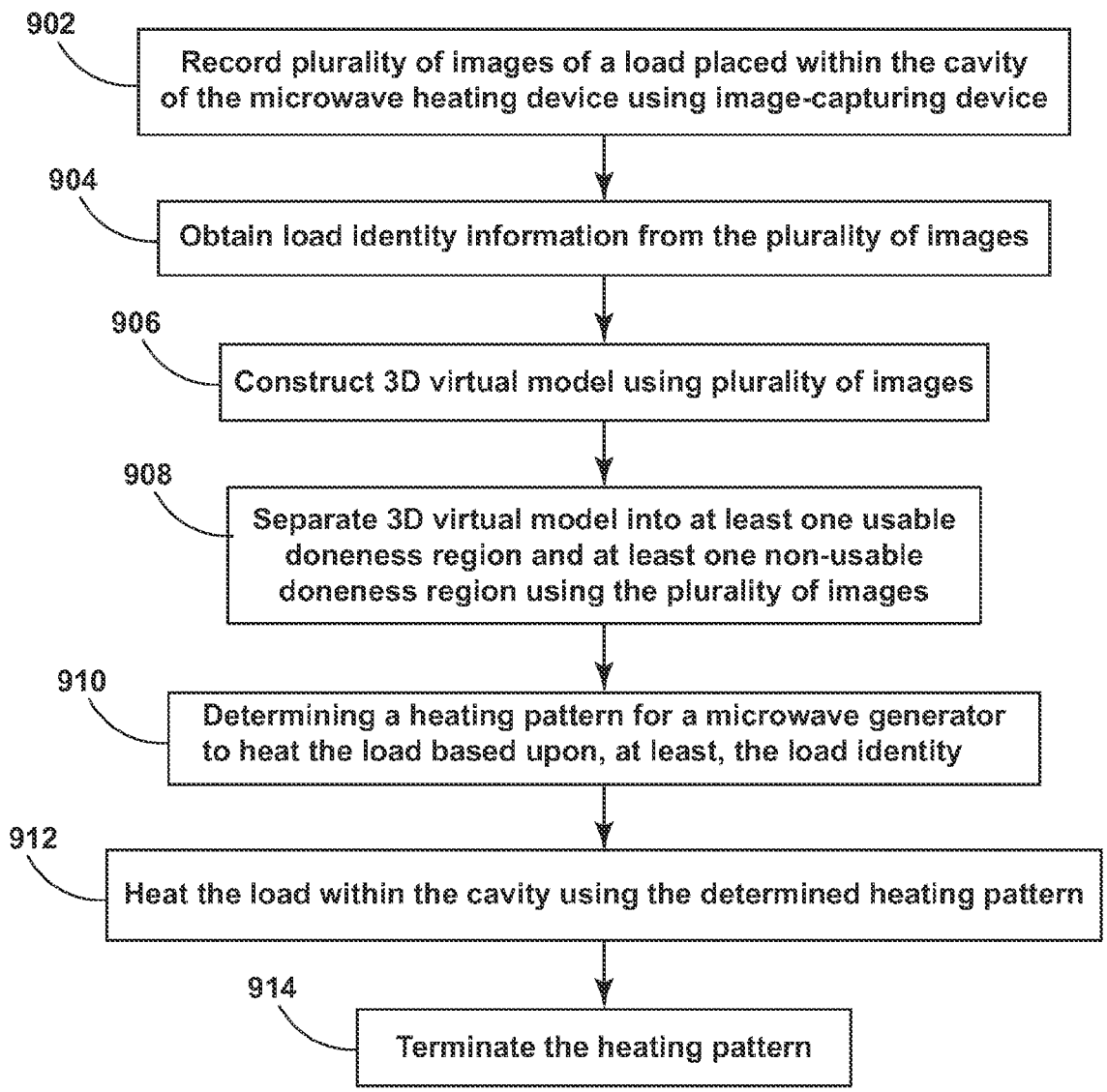
FIG. 15 is a schematic flow diagram illustrating another embodiment of a method for heating a load placed within a cavity of a microwave heating appliance.

Referring now to the embodiment illustrated in FIG. 15, an alternate method 900 of heating a load within a cavity 512 using microwaves 518 as used within a microwave heating apparatus 510 includes obtaining a plurality of images 542 using at least one image-capturing device 520 (step 902). The method also includes obtaining a load identity for a load 514 placed within a cavity 512 (step 904), wherein the load identity can be obtained either manually, automatically, or through a combination of automatic and manual inputs.

Referring again to the embodiment illustrated in FIG. 15, the method includes using the plurality of images 542 to create a 3D virtual model (step 906). The method further includes separating the 3D model of the load 514 into at least a usable doneness region and at least one non-usable doneness region (step 908). In step 908, various information about the plurality of potential loads 584 includes information about certain portions of the potential load 584 that will not be affected during the cooking process. By way of explanation, and not limitation, certain portions of a blueberry muffin, such as the blueberries that are exposed on the surface of the blueberry muffin, may not change shape or texture during the performance of the heating pattern 530. Conversely, portions of the muffin, such as the batter before cooking, will be greatly affected during the performance of the heating pattern 530 through a change in texture, change in size, change in color, and other measurable changes in the surface condition of the load 514. In various embodiments, the load 514 may contain non-usable doneness regions that are substantially less affected during the performance of the heating pattern 530 than the usable doneness regions. In such loads 514, a primary indicator of doneness within a particular load 514 may be contained only within the usable doneness region. Conversely, the same doneness parameter may not be evident within the non-usable doneness region, or may be far less evident or delayed within the non-usable doneness region. In this embodiment, the image-capturing device 520 and the control can be configured to focus on the usable doneness regions to determine doneness of the load 514. Accordingly, various information gathered about the load 514, that may have been skewed by information contained within the non-usable doneness region can be excluded to collect more accurate information regarding the doneness of the load 514.

Within various embodiments, various external factors such as ambient light, a type of camera, the type of lighting used within and around the microwave heating apparatus 510 and other such factors can, potentially, affect the quality of the images 542 gathered by the image-capturing device 520. In such instances, color constancy and/or color calibration algorithms can be incorporated to compensate for changes in ambient conditions such that more precise measurements can be gathered concerning the surface conditions of the load 514.

Referring again to the embodiment illustrated in FIG. 15, once the load 514 has been separated into the usable and non-usable regions, the method 900 includes determining a heating pattern 530 of the microwave generator 516 for heating the load 514 (step 910), wherein the heating pattern 530 is based upon the load identity in the at least one usable doneness region. The method 900 also includes heating the load 514 using the determined heating pattern 530 (step 912). The method 900 further includes terminating the heating pattern 530 when the control determines that at least a portion of the usable doneness region includes one or more doneness parameters that are substantially similar to the corresponding stored doneness parameter (step 914). The heating pattern 530 can also be terminated according to the expiration of a predetermined time period.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A microwave heating apparatus comprising:
   a cavity arranged to receive a load;
   at least one microwave generator configured to feed a plurality of microwaves into the cavity;
   at least one image-capturing device; and
   a control unit adapted to:
   obtain load volume information of the load within the cavity based on information recorded by the image-capturing device about at least one portion of the load, wherein the control is adapted to convert the information recorded by the image-capturing device into a plurality of two-dimensional silhouette images of the load and combine the plurality of two-dimensional silhouette images of the load to determine the load volume information;
   obtain load density information using at least one of a user input and information recorded by the image-capturing device about at least one portion of the load;
   determine load mass information based upon the load volume information and the load density information;
   determine a heating pattern based upon the load mass information; and
   control the at least one microwave generator to provide the heating pattern within the cavity.

2. The microwave heating apparatus of claim 1, further comprising:
   a load identity/density database having data regarding an identity of one or more potential loads and corresponding density information regarding each potential load, wherein the control is adapted to obtain the load density information by comparing load identity information to the load identity/density database, wherein the load identity information is determined by at least one of a user input and the information gathered by the image-capturing device as to at least a portion of the load.

3. The microwave heating apparatus of claim 2, wherein the load identity/density database includes:
   load identity data regarding the identity of the one or more potential loads and corresponding image information regarding doneness characteristics of each potential load, wherein the load identity data is determined by the information gathered by the image-capturing device as to at least a portion of the load, and wherein the information gathered by the image-capturing device is compared with the doneness characteristics, and wherein the load identity data gathered by the image-capturing device includes at least one of load color and load texture.

4. The microwave heating apparatus of claim 1, wherein the load volume information is determined by capturing a plurality of images of the load, wherein the control is adapted to separate out background information corresponding to portions of the cavity from foreground portions of the plurality of images corresponding to the load and calculate the load volume information by comparing the foreground portions of the plurality of images of the load.

5. The microwave heating apparatus of claim 4, wherein the plurality of images of the load are captured by a plurality of image-capturing devices positioned proximate the cavity.

6. The microwave heating apparatus of claim 1, wherein the control is further adapted to collect updated load surface information from the image-capturing device during performance of the heating pattern, wherein the control collects the updated load surface information at substantially regular time intervals, and wherein the control compares the updated load surface information with a stored load doneness table including load identity information and corresponding load doneness characteristics, and wherein when the updated load surface information is substantially similar to the corresponding load doneness characteristics, the control terminates the heating pattern.

7. The microwave heating apparatus of claim 6, wherein the load doneness characteristics include at least one of load color, load volume, load texture and load temperature.

8. The microwave heating apparatus of claim 1, wherein the at least one microwave generator includes a plurality of microwave generators, and wherein each of the microwave generators is configured to deliver the plurality of microwaves to the cavity through respective microwave ports.

9. A method of heating a load in a cavity using microwaves, the method comprising the steps of:
   obtaining a load identity for a load placed within a cavity;
   obtaining a load volume for the load using a plurality of images captured by at least one image-capturing device, wherein a control is adapted to pixelate the plurality of images into a plurality of pixels, and wherein the control is adapted to combine at least a portion of the plurality of pixels to define the load volume;
   using the load identity to determine a load density;
   determining a load mass using the load volume and corresponding load density;
   determining a heating pattern for the load based upon at least the load mass; and
   heating the load within the cavity using the determined heating pattern.

10. The method of claim 9, wherein the step of obtaining a load identity includes using at least one of a manual identity input and the plurality of images from the image-capturing device.

11. The method of claim 9, wherein the load volume is obtained by measuring and comparing datum points within each of the plurality of images.

12. The method of claim 11, wherein each of the plurality of images are captured by one image-capturing device, and wherein the load is rotated within the cavity.

13. The method of claim 9, wherein the step of using the load identity to determine a load density includes comparing the load identity to a load identity/density database, wherein the load identity/density database includes a plurality of load identities each corresponding to a load density, and wherein a control matches the load identity to one of the plurality of load identities to determine the corresponding load density.

14. The method of claim 9, further including the steps of:
collecting load surface information from the image-capturing device during performance of the heating pattern, wherein the control collects updated load surface information at substantially regular time intervals;
comparing the updated load surface information with a stored load doneness table including a plurality of load identities, each corresponding to set of load doneness characteristics, and wherein a control compares the updated load surface information with the corresponding load doneness characteristics to determine when the updated load surface information is substantially similar to the corresponding load doneness characteristics;
terminating the heating pattern when the updated load surface information is substantially similar to the corresponding load doneness characteristics.

15. A method of heating a load in a cavity using microwaves, the method comprising the steps of:
obtaining a plurality of images using at least one image-capturing device, wherein the at least one image capturing device is adapted to capture a plurality of load silhouettes;
obtaining a load identity for a load placed within a cavity;
separating the load into at least one usable doneness region and at least one non-usable doneness region using the plurality of load silhouettes;
determining a heating pattern of a microwave generator for heating, wherein the heating pattern is based upon the load identity and the at least one usable doneness region;
heating the load within the cavity using the determined heating pattern; and
terminating the heating pattern when a control determines that at least a portion of the at least one usable doneness region includes at least a portion of the usable doneness region is substantially similar to a corresponding stored doneness characteristic.

16. The method of claim 15, wherein the step of obtaining a load identity includes using at least one of a manual identity input and the plurality of images from the image-capturing device.

17. The method of claim 15, further including the steps of:
obtaining a load volume for the load using the plurality of images captured by the at least one image-capturing device;
using the load identity to determine a load density;
determining a load mass using the load volume and corresponding load density; and
determining the heating pattern for the load based upon at least the load mass.

18. The method of claim 17, wherein the heating pattern includes a power-level pattern and cook-time pattern, and wherein the step of terminating the heating pattern is configured to cut short at least one of the power-level pattern and the cook-time pattern before predetermined ends of the power-level pattern and cook-time pattern, respectively, when the at least one doneness characteristic is substantially similar to the corresponding stored doneness characteristic.

19. The method of claim 11, wherein each of the plurality of images are captured by one image-capturing device, and wherein the load is rotated within the cavity.

20. The method of claim 18, wherein the load volume is determined by the control by comparing the plurality of images of the load.

* * * * *